(12) United States Patent
Winnemoeller et al.

(10) Patent No.: US 8,514,238 B2
(45) Date of Patent: Aug. 20, 2013

(54) SYSTEM AND METHOD FOR ADDING VECTOR TEXTURES TO VECTOR GRAPHICS IMAGES

(75) Inventors: Holger Winnemoeller, Seattle, WA (US); Alexandrina Orzan, Grenoble (FR)

(73) Assignee: Adobe Systems Incorporated, San Jose, CA (US)

( * ) Notice: Subject to any disclaimer, the term of this patent is extended or adjusted under 35 U.S.C. 154(b) by 936 days.

(21) Appl. No.: 12/570,632

(22) Filed: Sep. 30, 2009

(65) Prior Publication Data

US 2013/0127889 A1 May 23, 2013

Related U.S. Application Data

(60) Provisional application No. 61/116,985, filed on Nov. 21, 2008.

(51) Int. Cl.
*G09G 5/00* (2006.01)
(52) U.S. Cl.
USPC .......................................................... 345/582
(58) Field of Classification Search
None
See application file for complete search history.

(56) References Cited

U.S. PATENT DOCUMENTS

2003/0206176 A1* 11/2003 Ritter ............................ 345/582

OTHER PUBLICATIONS

Joshi et al; Repoussé: Automatic Inflation of 2D Artwork; Eurographics Workshop on Sketch-Based Interfaces and Modeling; Jun. 2008.*
Johnston; Lumo: Illumination for Cel Animation; NPAR '02 Proceedings of the 2nd international symposium on Non-photorealistic animation and rendering ; 2002.*
Liu et al.; Near-Regular Texture Analysis and Manipulation; ACM Transactions on Graphics (TOG)—Proceedings of ACM SIGGRAPH 2004.*
Winnemoller et al; Texture Design and Draping in 2D Images; Eurographics Symposium on Rendering; Jul. 2009.*
Ray et al; Vector Texture Maps on the GPU; alice.loria.fr; 2005.*
Nehab et al.; Texel Programs for Random-Access Antialiased Vector Graphics; Microsoft Research Technical Report; Jul. 2007.*
Qin et al; Real-time texture-mapped vector glyphs; I3D '06 Proceedings of the 2006 symposium on Interactive 3D graphics and games; 2006.*
Gimel'farb; Texel-Based Prototypes of Regular Mosaics; SSPR/SPR 2002.*
Orzan et al; Diffusion curves: a vector representation for smooth-shaded images; ACM Transactions on Graphics (TOG)—Proceedings of ACM SIGGRAPH 2008; vol. 27 Issue 3, Aug. 2008.*
Asente et al; Dynamic planar map illustration; ACM Transactions on Graphics (TOG)—Proceedings of ACM SIGGRAPH 2007; vol. 26 Issue 3, Jul. 2007.*

* cited by examiner

*Primary Examiner* — Carlos Perromat
(74) *Attorney, Agent, or Firm* — Wolfe-SBMC

(57) ABSTRACT

A system and method for adding vector textures to images may employ a unified vector representation for images and textures based on extensions to diffusion curve representations, along with tools to facilitate the draping of texture maps over an image. This vector representation may support user-configurable parameters that allow artists to design and manipulate complex textures at a high-level, and to deform them directly in two-dimensional images. The vector representation may provide material descriptors and visual cues of three-dimensional shape in two-dimensional images. It may facilitate the creation of lighting and shading effects in such images. The system may include tools to manipulate the configurable parameters to create texels, to distribute texels in a texture map, to automatically generate new texture elements, to generate 2.5D surface approximations of two-dimensional images based on diffusible normal attributes, and/or to apply a texture by mapping or projecting it onto such 2.5D surface approximations.

20 Claims, 23 Drawing Sheets

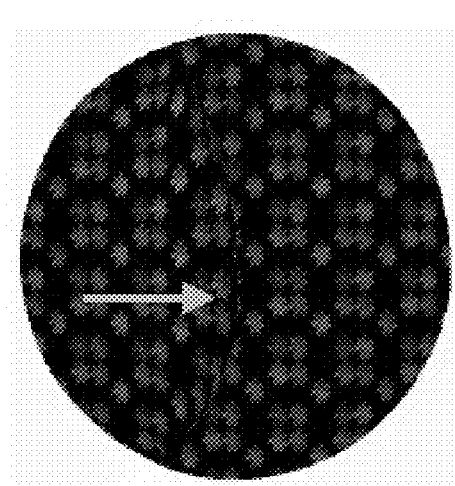
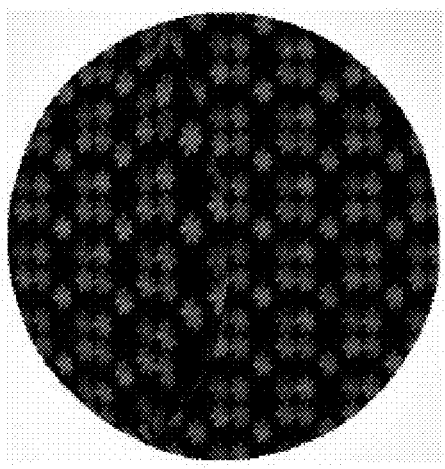
FIG. 6A
FIG. 6B
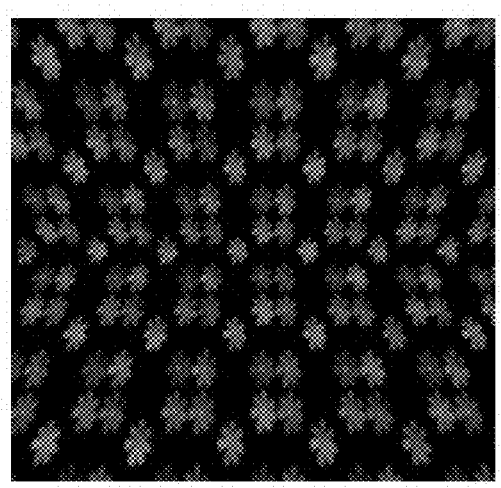
FIG. 7

SYSTEM AND METHOD FOR ADDING VECTOR TEXTURES TO VECTOR GRAPHICS IMAGES

PRIORITY INFORMATION

This application claims benefit of priority of U.S. Provisional Application Ser. No. 61/116,985 entitled "System and Method for Adding Vector Texture to Vector Graphics Images" filed Nov. 21, 2008, the content of which is incorporated by reference herein in its entirety.

BACKGROUND

Description of the Related Art

Textures play a vital role in human perception and have found widespread use in image synthesis from three-dimensional (3D) scenes. As early as 1950, researchers described the importance of textures for the perception of optical flow, and many authors have since investigated how texture variations are linked to the perception of material properties and surface attributes, most prominently shape. Artists and designers also commonly employ textures to embellish objects, such as furniture, clothes, or walls, with designs and color.

While much previous work has focused on generating planar textures procedurally or via texture synthesis, and mapping textures onto 3D objects, relatively little work exists on manually designing and deforming textures purely in two-dimensional (2D) images. Texture support in popular vector formats, such as SVG, CorelDraw™, Flash™, or Adobe Illustrator™, is commonly limited to bitmaps, simple repetitive patterns, or pre-defined procedural textures, which are mapped onto the image with simple scaling or in-plane rotation. Adobe Illustrator™ recently introduced 3D texture mapping, which requires a full 3D model and cannot be controlled at a lower level. Existing vector formats are typically limited in appearance variation, specifically for gradients, which are essential to depict many types of images, ranging from illustrations to photorealism. The placement of 2D and 3D textures on the surfaces of 3D models has been extensively studied. Much of the work addresses atlas construction of 3D models or through-the-lens manipulation of texture coordinates on the projected models. Purely 2D texture manipulation is typically limited to planar appearances or mesh-based warping.

Mesh-based vector representations (such as gradient meshes) typically require much user input, and the mesh topology tends to be unintuitive (not aligned with visual image features). Thus, these representations are difficult to manipulate without the support of high-level tools. A painting metaphor was previously used as a user-interaction tool for designing raster-based as well as procedural textures. Some more recent systems address the learning of user-defined strokes and arrangements to produce larger texture maps with qualitatively similar textures. For example, they may consider both the shape of texels and their placement as a simultaneous problem.

The subject of texture synthesis has been extensively addressed for many years, but few methods have been proposed for dealing specifically with vector textures. One approach fills in entire 2D regions with user-defined vector elements in a flat-looking arrangement, and does not consider how the texture aspect is influenced by the surface on which it lies. Some texture manipulations have been proposed for bitmap images. For example, one method proposes parameters and manipulations for progressively variant textures, and a second method uses shape-from-shading to texture objects in photographs. Both these methods are strictly restricted to draping of pre-defined bitmap textures.

SUMMARY

Various embodiments of a system and method for adding vector textures to images (e.g., vector graphics images, or vector representations of photographic images) are disclosed. The system may employ a vector representation for images and/or textures (e.g., one based on extensions to a diffusion curve representation) that allows artists to define and deform complex textures directly in two-dimensional images. The vector representation may support a set of user-configurable parameters that may allow artists to design and manipulate texture at a high-level, making high-complexity patterns easy to edit. The vector representation may include information applicable to two roles of a visual texture, i.e., as a material descriptor and as a two-dimensional visual cue for an underlying three-dimensional shape represented in a two-dimensional image. The vector representation may also facilitate the creation and manipulation of lighting and shading effects in such images.

The system may in some embodiments include tools usable to manipulate the vector representations. These tools may make use of the defined parameters to generate 2.5D surface approximations of two-dimensional images, to distribute atomic texture elements (texels) using distribution brushes, to automatically generate new texture elements, and/or to apply a texture to a portion of a two-dimensional image (e.g., by mapping or projecting it on a 2.5D surface approximation of the image).

In various embodiments, the structures and parameters of the vector representation may be used to:

Automatically create a vector texture with elements of randomized attributes from a few user-drawn examples. In some embodiments, new texture elements may be generated automatically, and may look similar, but not identical to, the user-drawn input.

Create progressively-variant textures. Unlike a homogeneous texture, these textures may exhibit continuously varying properties, such as scale, orientation, color, and shape variations of the texture elements.

Integrate textures with vector graphics drawings. The texture may be semi-automatically deformed to depict scene depth, surface orientation and/or other 3D shape properties.

Automatically define shading variations using virtual lights positioned by the user.

The system and methods described herein may in various embodiments include tools to facilitate the draping of texture maps in an image. The system may apply piece-wise-smooth editing principles, such as those of diffusion curves, to the specification and application of textures. Basic principles of diffusion curves are described in more detail herein. The sparse vectorial specification of the vector textures and subsequent diffusion of attributes may provide a convenient and intuitive editing paradigm, in some embodiments.

In some embodiments, the system described herein may provide functionality to create a representation of a visual texture. In such embodiments, creating a vector texture representation may include receiving input specifying one or more texture distribution rules and applying these texture distribution rules to atomic texture elements (texels) to create a texture map of the visual texture. The texture distribution rules may include a rule defining a regular grid over which instances of each of the atomic textural elements are to be distributed, or a rule defining a uniform randomized distribution of the atomic textural elements, in various embodiments.

Applying the texture distribution rules may include replicating the atomic textural elements to create two or more instances of each of the atomic textural elements to be distributed within the texture map. The replicated and distributed texels may include instances of one or more example texels (e.g., user-drawn texels created in response to receiving input specifying one or more geometric or photometric properties of the texels) and instances of other automatically generated variations of those example texels, in some embodiments. For example, the system may be configured to modify a value of at least one parameter (e.g., a color, shape, normal, orientation, rotation, or size) of the example texels to generate additional texels of the visual texture. In some embodiments, modifying the texel parameter values may include interpolating between values of a parameter of two or more example texels to determine values of the parameter for the additional texels. In some embodiments, the data representing the texture map may include data representing one or more diffusion curves. For example, diffusion curves and/or diffusible parameters may be defined within any of the texels of the visual texture. Once texels and distribution rules have been created and/or specified for a visual texture, data representing a texture map for the visual texture may be stored for subsequent application of the visual texture to an image, or to a portion of an image.

In some embodiments, applying the visual texture to an image may include accessing data representing a two-dimensional image and generating a planar map defining two or more regions of the two-dimensional image. The image data may include data representing one or more diffusion curves associated with the two-dimensional image. For example, diffusion curves and/or diffusible parameters may be defined for all or a portion of the two-dimensional image. In some embodiments, the planar map may be generated dependent on those diffusion curves. For example, each region may correspond to a portion of the image bounded by all or a portion of two or more diffusion curves.

In both texture definitions and support drawings that include diffusion curves, the data representing the texture or support drawing may include data representing a diffusible attribute (e.g., a color, blur, normal, or height field attribute) whose value is specified at one or more control points along the diffusion curves and these attributes may be diffused within the selected region as part of applying the visual texture to the selected region.

Applying the visual texture to a selected one of the regions of the two-dimensional image may include mapping or projecting the visual texture onto the selected region, or onto a theoretical three-dimensional surface representation of the two-dimensional image serving as a support drawing to the texture application operation. This support drawing may comprise the diffusion curves that define a planar map. Applying the visual texture to the selected region(s) may include distorting the texture-map to generate data representing the theoretical three-dimensional surface, dependent on a normal attribute associated with the diffusion curves of the two-dimensional image. Applying the visual texture to the support drawing may produce an output image in which the visual texture is draped over the selected region in the 3D representation of the image.

In some embodiments, applying a visual texture to an image may include receiving input specifying a value of one or more texture parameters of the visual texture, such as a translation in a specified plane, a rotation around a specified axis, a spacing between atomic texture element instances, a size of one or more atomic texture element instances, or an orientation of one or more atomic texture element instances, and modifying the visual texture in accordance with the received value(s).

In some embodiments, applying the visual texture may include applying a shading or lighting effect to the 3D representation of the image (or to the selected region of the image) dependent on one or more of: a diffusible attribute of the texture map, a diffusible attribute of the image (or selected region thereof), a light source applied to the two-dimensional image, a shading model, a camera parameter, or a viewer parameter. For example, in one embodiment, a shading effect may be applied to the texels of the texture map (according to normal attributes of the texels) to simulate 3D macro structure.

In various embodiments, the methods described herein may be implemented by program instructions stored on a computer readable storage medium and executable by one or more CPUs and/or GPUs. For example, they may be implemented as program instructions that, when executed, implement creation of vectorial textures and/or application of vectorial textures to two-dimensional images in response to user input, e.g., as part of an image editing application. In some embodiments, a vectorial texture and/or the portion of an input image on which to apply a vectorial texture may be specified by a user, e.g., through a user interface of the image editing application. In some embodiments, various parameters of the methods described herein may be specified by the user (e.g., through such a user interface).

BRIEF DESCRIPTION OF THE DRAWINGS

FIGS. 6A-6B illustrate an example of a texture translation, according to various embodiments.

FIG. 7 illustrates an example of the effect of locally varying parameters on a texture, according to various embodiments.

Figure 1:
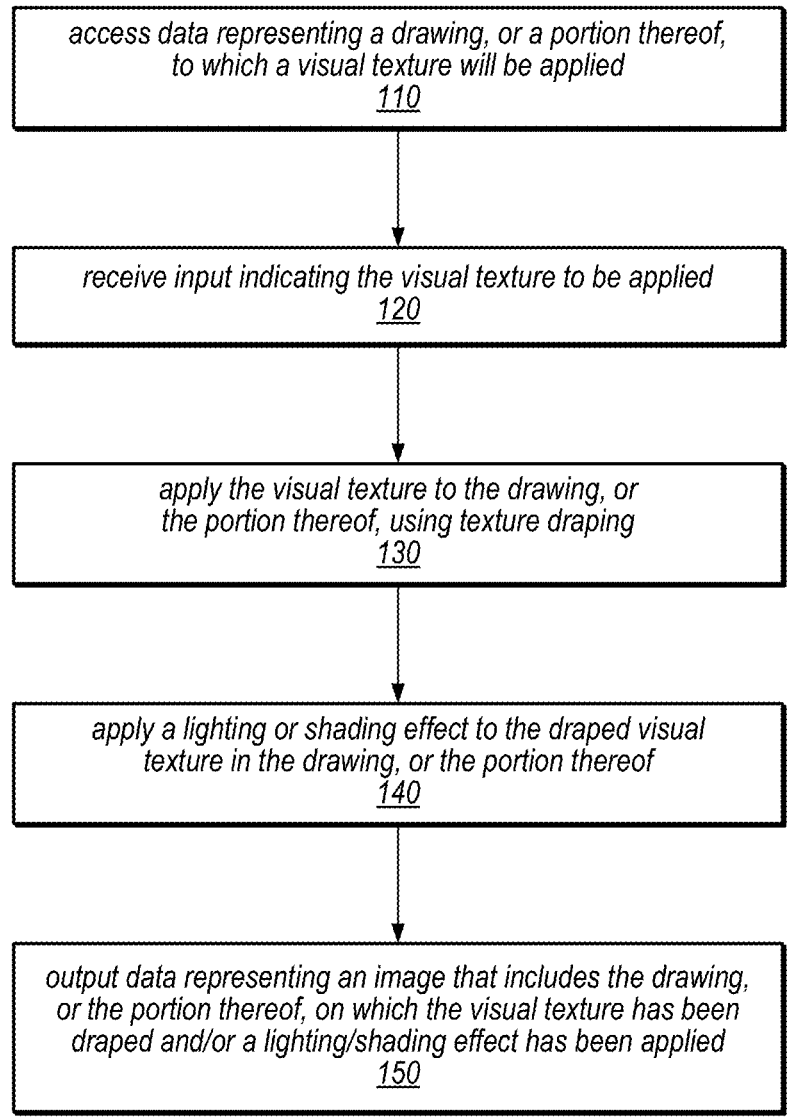
FIG. 1 is a flow diagram illustrating a method for adding vector textures to a 2D image, according to various embodiments.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A structure for adding vector texture to a vector graphics image may include the actual representation of the vector textures and the tools and methods for manipulating the representation. As described herein, the system may employ an image representation based on diffusion curves, which is extended to represent textures. In some embodiments, this image representation may include definitions for additional diffusion curve properties (e.g., normals), as well as for texture properties (e.g., global affine transformations, texels, and/or texel variations). The system may in some embodiments provide functionality to allow a user to design diffusion-curve-based texture representations, and to drape these representations (or other types of texture representations, such as various vector patterns or bitmap graphics) onto a 2D image (e.g., through a graphical user interface, or GUI). In some embodiments, the system may provide functionality for rendering vectorial texture images efficiently on a graphics processing unit (GPU).

In some embodiments, a system may provide a 2D vector image representation that includes native support for textures, and may also provide tools for creating and manipulating these textures. The methods described herein may allow for the application of vector textures directly to a 2D vector image, without requiring full 3D information, using a process that may be referred to as "texture-draping". Since the image representation is vectorial, it may be compact and may remain editable with convenient, high-level editing tools, which may support common artistic workflows. While many of the descriptions included herein involve the application of these methods to regular and near-regular textures, the vector image representation may be extended to handle other types of textures (e.g., various irregular or stochastic textures, and non-vector textures, such as bitmap textures, generated procedurally, through texture synthesis or via any other suitable method).

Bitmap images typically lack the descriptive power to specify textures as such, a fact that may make texture analysis and manipulation in bitmap images extremely difficult. Vector images, on the other hand, may possess semantic capabilities to describe and parameterize textures. Yet, the implementation of textures in current practice has typically been limited to relatively simple designs or patterns, or somewhat more elaborate procedural textures. These textures may be directly rendered onto an image plane without much support to direct the arrangement of the texture in the image, for example, to suggest shape. This may be due in part to the fact that, previously, vector images lacked the expressive powers to depict complex image content.

The system described herein for adding vector texture to vector graphics images may in some embodiments define a self-consistent vector image representation with texture support, i.e. a texture parameterization that combines basic vector primitives into texture maps. This may facilitate the use and rendering of mixed textured and non-textured elements. In some embodiments, this may be achieved by extending a diffusion curve representation to natively handle textures with intuitive parameters. These extensions, which are described in more detail below, may allow for detailed placement of textures, and may enable simple lighting effects in addition to the complex appearance variations of diffusion curves.

In some embodiments, the system may also provide powerful, high-level tools to intuitively manipulate the texture parameters, and to drape the texture maps in a 2D image. Using the paradigm of piecewise smooth image variations, the system may allow the user to sparsely define texture parameters, including normals, along curves of discontinuity. These parameters may be diffused globally for convenient and powerful texture control, as described in more detail below. In addition, the system may provide an interactive vector drawing implementation based on GPU-accelerated rendering, in some embodiments. This may allow artists to interactively design and manipulate vector textures in 2D images.

As used herein, the following terms may be defined as follows:

texel—An atomic texture element, which may be distributed repetitively over an image plane texture map—A planar image representation of a texture. This may comprise an arrangement of texels generated automatically according to various distribution rules, or generated using another method, in different embodiments.

texture-draping—The process of applying a texture map to a 2D image. Note that this may not refer to a mere mechanical texture mapping, but rather to the use of tools and techniques allowing an artist to specify parameters manually, e.g., to suggest shape.

Perceptual cues usable to detect shape from texture variations (such as compression, i.e. the projective change in texel shape when mapped onto a surface non-orthogonal to the viewer, density, and perspective) may be stronger for more regular and uniform texture maps, than for irregular ones. Therefore, the texture-draping techniques described herein may be best demonstrated as they are applied to regular and near-regular texture types, as described below.

To allow an artist or designer a high level of convenience, control, and flexibility, the system described herein may in some embodiments employ a parametric, vector-based texture description, which may permit intuitive and continued editing of a textured image. Such vector images may exhibit other advantages over bitmapped images, such as resolution-independence and compactness. As noted above, diffusion curves may provide the basis of the vector representation described herein. Diffusion curves are described in detail in U.S. Provisional Application Ser. No. 61/197,250 entitled "Diffusion Curves: A Vector Representation for Smooth-Shaded Images" filed Oct. 24, 2008, the content of which is incorporated by reference herein in its entirety. The use of Diffusion Curves may allow a large amount of freedom in the texel styles, because they themselves may include complex color variations and blur. For example, with diffusion curves, the shape of a texel may be given by Bézier splines, and the color and normal variations may be defined at control points positioned along the curves. In some embodiments, the normalized aspect of a texture (i.e. how the texture looks when placed on a flat surface facing the viewer) may be specified in the description of the texture layout. For example, the texture may be represented by a data structure comprising a set of texture elements (texels), which are arranged using a specified spatial distribution function.

The vector image representation described herein may capture the two roles of a visual texture: the role of a material descriptor and the role of providing 2D visual cues for an underlying 3D shape. It may also allow for the easy creation and manipulation of lighting and shading effects, in some embodiments. For example, a set of parameters may be defined that allows users to design and manipulate texture at a high-level, making high-complexity patterns easy to edit. In some embodiments, a collection of tools may be provided that makes use of these defined parameters (including 2.5D surface approximations), distribution brushes, and other mechanisms to provide automatic generation of new texture elements from a few user-drawn examples. The system may define parameters that allow the user to easily create textures in a vector drawing. For example, the parameters may describe the texture layout, the texture deformation inside a vector graphics drawing, and/or 2.5D surface approximations, in various embodiments. In some embodiments, 2.5D techniques may include 2D drawings with additional dimensionality data, which may allow for specifying and/or computing higher-dimensional shapes (such as 3D) given additional constraints on interpreting the additional dimensionality data.

These structures and parameters may in various embodiments be used for multiple image enhancements, such as:

Automatically creating a vector texture with elements of randomization from a few user-drawn examples. In other words, new texture elements may be generated automatically, and may look similar, but not identical to, the user-drawn input.

Creating progressively-variant textures. For example, unlike a homogeneous texture, these textures may have continuously varying properties, such as scale, orientation, color, and/or shape variations of texture elements.

Integrating textures with vector graphics drawings. For example, a texture may be semi-automatically deformed to depict scene depth, surface orientation, and/or other 3D shape properties.

Automatically defining shading variations using virtual lights positioned by the user.

Although the image representation described herein is directed primarily to vector graphics creation, these structures and/or parameters may in other embodiments be directly used to create texture and shadings for bitmap images.

One method of adding vector textures to a 2D image is illustrated by the flow diagram in FIG. 1, according to one embodiment. In this example, the method may include accessing data representing a vector drawing (or bitmap image), or a portion thereof, to which a visual texture will be applied, as in 110. This data may be accessed in response to being imported into an application configured for image creation and/or editing, or may be resident in memory accessible to such an application as a result of being imported previously, or as a result of being created and/or modified by the application prior to the desired editing operation. Note that, as used herein, the term "image editing application" may refer to a graphic application that is specifically directed to image editing, or to any application that includes an image editing component, according to various embodiments. The data accessed may represent a whole image or a portion of an image to which a visual texture is to be applied, in different embodiments. In some embodiment, a user may select a portion of an image (e.g., a wall, article of clothing, or piece of furniture) to which a visual texture should be applied using a selection tool of GUI of such an image editing application. One such GUI is described in more detail later.

In this example, the method may also include receiving input indicating a visual texture to be applied to the drawing or portion thereof, as in 120. For example, in some embodiments, input identifying the selection of a visual texture may be received via a GUI of an image editing application (e.g., a pull-down menu, a pop-up menu, a tool usable to select a visual "swatch" from a palate of such swatches, or through any other suitable input mechanism). As illustrated in FIG. 1, the method may include applying the visual texture to the entire drawing or to a portion thereof, as in 130. In some embodiments, applying the texture to a portion of the drawing may include generating a planar map defining two or more regions of the drawing (e.g., two or more regions of a vector drawing) dependent on or defined by one or more geometric curves (e.g., Bézier curves, Catmull-Rom splines, or other types of curves) associated with the drawing, and attaching the visual texture to an identified one of the regions of the drawing. In some embodiments, these geometric curves may be associated with diffusible parameters (i.e. they may represent diffusion curves). Applying the visual texture to the drawing (or portion thereof) may include distorting the texture according to any normals associated with the drawing (e.g., as specified along one or more diffusion curves) and/or any normals associated with the texture map of the visual texture itself.

As described in more detail below, in some embodiments, attaching a visual texture to a drawing may include receiving input indicating an attachment point within the drawing or portion thereof at which the selected visual texture should be applied, e.g., through positioning of a cursor in a GUI of an image editing application. In some embodiments, attaching a visual texture to a drawing may also include receiving input indicating a rotation, scaling, or translation to be applied to the associated texture map when draping it over the drawing. For example, in some embodiments, a GUI of an image editing application may include input mechanisms to allow a user to select, drag, contract, and/or stretch a "swatch" of the visual texture to indicate the position, rotation, and/or scale of the texture in the drawing. Applying the visual texture to the drawing (or portion thereof) may therefore be dependent on any inputs indicating an attachment point and/or any inputs indicating a translation, rotation, or scaling to be applied to the associated texture map as the visual texture is draped over the image.

As illustrated in FIG. 1, the method may include applying a lighting or shading effect to the visual texture that is draped over the drawing, as in 140. For example, in some embodiments, the method may include receiving input indicating a position and/or other parameters of a light source with respect to the draped portion of the drawing (e.g., through a GUI of an image editing application), and applying a lighting or shading effect dependent on those parameters, as well as on a normal attribute associated with the drawing and/or a normal attribute associated with the texture itself (e.g., as defined by its associated texture map).

As illustrated in FIG. 1, the method may include outputting data representing an image that includes the drawing (or portion thereof), on which the visual texture, lighting effect, and/or shading effect have been applied, as in 150. For example, the data may be provided to a display component of the image editing application for display of the texture-draped drawing to the user and/or the data may be stored as in intermediate image by the image editing application for further processing by the application (or another application) or as a final image (e.g., written to main memory, a file, an archive, etc.).

Figure 2B:
FIGS. 2A and 2B illustrate a vector drawing that includes diffusion curves and the application of four different textures to the vector drawing, respectively.
Figure 2A:
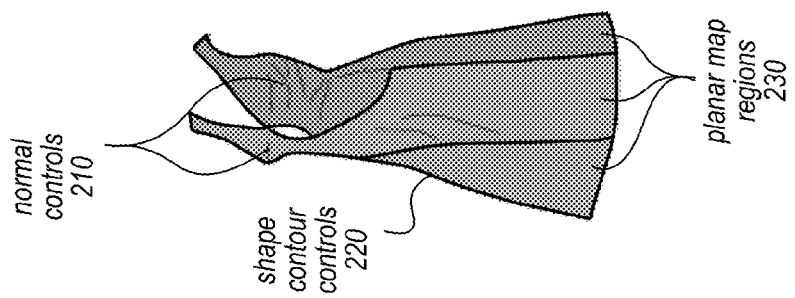

Using the system and methods described herein, an artist may be able to globally place a texture in a given region and may be able to control how it folds, ripples, and flows over an implied surface. As illustrated in the images in FIGS. 2A and 2B, many texture features, such as surface-shape, pattern continuity, pattern flow, and occlusions, may be discontinuous along lines or curves in the image plane, and may be relatively smooth everywhere else. In addition, many color variations in an image may be explained, or represented, as originating at edges of varying sharpness, and diffusing outwards. This principal may in some embodiments be employed to equip vector images with complex gradients. By constraining some image editing operations to these edges, the system described herein may mimic the common artistic workflow of roughing-in-and-filling. This editing paradigm, in which local operations to these edges may affect large regions of the image all at once, may be employed by the system to specify and manipulate textures in 2D images. The texture draping approach described herein may support editing operations along discontinuity curves that allow for precise placement of textures in an image, as well as for control of other parameters affecting the appearance of a draped texture in the image. For example, FIG. 2A illustrates a vector drawing that includes diffusion curves for specifying normal controls 210, and diffusion curves for specifying shape contours 220. In this example, three planar regions 230 are defined by diffusion curves. FIG. 2B illustrates that, given a set of texture-edit curves (i.e. diffusion curves for which texture parameters are specified), any number of vectorial textures may be applied to a vector drawing. FIG. 2B illustrates the application of four different textures to a vector drawing (here, composited over a photograph). Note that the textures are applied at different orientations and with different lighting and/or shading effects in each of the three planar regions. In some embodiments, vectorial textures such as those represented by the inset vectorial texture swatches illustrated in FIG. 2B, may also designed using the system described herein.

The system described herein may in some embodiments include a texture map creation tool that allows users to design regular and near-regular vector textures from scratch. In some embodiments, to create a texture map for a visual texture, the system may include input mechanisms to allow a user to design one or more texels and to define one or more distribution rules for those textures as they are replicated in the texture map. As previously noted, a texel is a recurring thematic element of a visual texture. In some embodiments, a texel may be represented as a figure defined by its geometric and photometric properties. These may include, but are not limited to:

Shape
Color
3D normals (and/or height fields, which may or may not be derived from those normals)

In various embodiments, a user may create a texel drawing using tools similar to those that would be used to create any other vector drawing (e.g., tools of an image editing application, such as a painting, publishing, photography, game, animation or other application). Due to the vector form of the textures, the user may in some embodiments create a recursive definition, which may define textures of textures. In some embodiments, the vector form may also allow a level-ofdetail approach, in which certain details of the texture are only made visible when the image is zoomed-in (i.e., viewed at a high level of resolution). In some embodiments, the user may draw a texel that is automatically replicated throughout a grid. The user may also define texture distribution rules specifying how the texel is to be repeated across a 2D plane to form the texture. Considering the degree of regularity in the pattern, textures have been conventionally classified into stochastic, irregular, near-regular and regular patterns. In some embodiments, the system described herein may provide an interface for designing textures that exhibit regular, through near-regular, to irregular texel distributions. In some embodiments, once an example texel has been drawn and automatically replicated (e.g., using a default or user-specified grid spacing), the user may define (or redefine) the spacing between neighboring texels by interactively adjusting the grid spacing.

In some embodiments, for a more varied appearance, several example texels may be defined. In some embodiments, as soon as the user has drawn two examples, new texels may be automatically generated by linear interpolation of various texel parameter values associated with each texel. In some embodiments, the system may not support texel generation from two independent texel examples. In such embodiments, a user may draw a first example texel and then may modify that first example to create a second texel example. This may ensure a one-to-one correspondence between the two example texels, and may facilitate interpolation (linear or otherwise) of each of the applicable texel parameters to create additional texels. Since the texel parameters are defined independently, the system may treat them separately. For example, the system may interpolate between color values, while using the same values for the shape, or vice versa. If the user draws additional example, these may also be used to generate new shapes and colors. Thus, from a few such user-defined texels, the system may automatically create new texels through independent texel variation parameters, such as:
  Color interpolation between user-defined texels
  Shape interpolation between user-defined texels
  Appearance, e.g., by choosing different example texels from which to generate new texels
  Scale In some embodiments, texel creation and generation may benefit from the specification of diffusion curves. As described in more detail below, these diffusion curves may allow the user to depict complex gradients (e.g., in color, blur, etc.) and may also be enhanced by the specification of normals. In some embodiments, the system may automatically create new texel instances by interpolating the shape, normal, color and blur parameters of the example texels.

Figure 3:
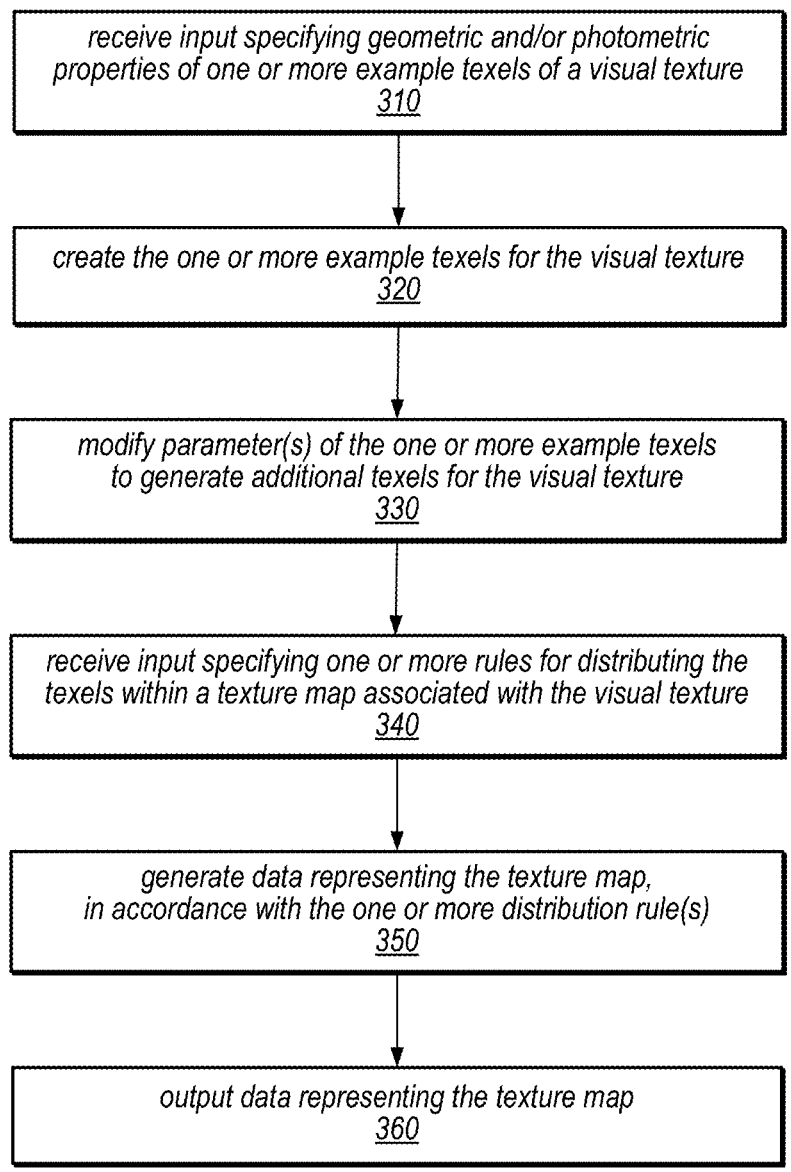
FIG. 3 is a flow diagram illustrating a method for generating a texture map for a vectorial texture, according to various embodiments.

One method for generating a texture map for a vectorial texture is illustrated by the flow chart in FIG. 3. In this example, the method may include receiving input specifying geometric and/or photometric properties of one or more example atomic texture elements (texels), as in 310. For example, the method may include receiving input indicating the shape of each texel, the color of each texel, or a 3D normal attribute of each texel. In some embodiments, such inputs may be received via a GUI of an image editing application through which a user can select an existing texel or create a new or modified texel (e.g., using a drawing tool and other input mechanisms to specify values for various parameters associated with the texel). Each of the properties associated with a given texel may be associated with the texel as a whole, or may be associated with a point along a diffusion curve defined for the texel (e.g., defining a value of the property on one side of the diffusion curve at that point). In the example illustrated in FIG. 3, the method may include creating one or more example texels based on the inputs received, as in 320. As described above, creating a texel based on such inputs may include diffusing parameter values along a diffusion curve associated with the texel.

As illustrated in FIG. 3, the method may include modifying a value of at least one parameter of the example texels to generate additional texels of the visual texture, as in 330. For example, in some embodiments the parameter values that may be modified to generate additional texels may specify a color, shape, normal, orientation, rotation, or size of the texel. As described above, the method may include modifying such parameter values by interpolating between the values of at least one parameter for one or more of the example texels to determine parameter values for one or more additional texels. In some embodiments, the method may include automatically performing such modifications to generate additional texels (e.g., according to a default algorithm for generating texels from example texels), while in other embodiments, modification of texel parameters to generate additional texels may be wholly or partially controlled through user input (e.g., user input specifying which parameter(s) to modify and/or the number of variations to generate). Note that in some embodiments, the system may be configured to allow a user to specify through another interface (such as a dialog box or palette) the aspects of a texel that are to be randomized to generate new texels, and the amount by which they are to be randomized, rather than the system implicitly or automatically determining how to generate new texels from any provided examples. Note also that in various embodiments, new texels (i.e. texel variations) may be generated from one, two, or any number of example texels. In the trivial case, a single texel may be replicated perfectly, i.e. to create a regular texture. In some embodiments, the system may be configured to randomly perturb parameters of a single texel to create texel variations, as described herein. In other embodiments, the system may be configured to generate texel variations from two or more example texels, i.e. to allow an artist to specify the parameters to alter, and by how much, by providing two or more example texels. In such embodiments, a randomization module configured to create texel variations may be configured to determine the parameters having different values in the two or more example texels, and the variation amounts exhibited in the examples, and may use these as guidance to make similar modifications throughout the texture map. Many other methods for generating texel variations from one, two, or any number of example texels are possible and contemplated.

As illustrated in FIG. 3, the method may include receiving input specifying one or more distribution rules for distributing instances of the example texels and/or any automatically generated texels in a texture map associated with the visual texture, as in 340. For example, in some embodiments, the method may include receiving input through a GUI of an image editing application specifying a horizontal or vertical spacing to be applied between texels in the texture map and/or an allowed spacing variation (e.g., inputs specifying parameters of a regular or near-regular grid). The method may include generating data representing a texture map that defines an arrangement of one or more instances of each of the texels of the visual texture, according to these and/or other distribution rules (e.g., any default distribution rules), as in 350. For example, in some embodiments, the method may include replicating each of the texels, and distributing the replicated texels over a regular grid. In other embodiments, the method may include replicating each of the texels, and distributing the replicated texels using a uniform randomized method. In some embodiments, the method may include distributing texels on a regular grid according to default or user-specified spacing rules, and then receiving additional inputs to modify the horizontal and/or vertical spacing applied to the texture map. For example, the method may include receiving input through a GUI of an image editing application that allows a user to select and then stretch or compress one or more grid elements in order to modify the texture map, in some embodiments.

As illustrated in FIG. 3, the method may include outputting data representing texture map, as in 360. For example, the data may be provided to a display component of the image editing application for display of the texture map to the user and/or the data may be stored by the image editing application for further processing by the application (or another application) or stored as a final result (e.g., written to main memory, a file, an archive, etc.). As previously noted, the texture map may be accessed for subsequent application of the visual texture to a vector drawing (or a portion thereof), or to a bitmap image (e.g., in the case that vector elements may be combined with bitmap elements in a single drawing or image).

Figure 4:
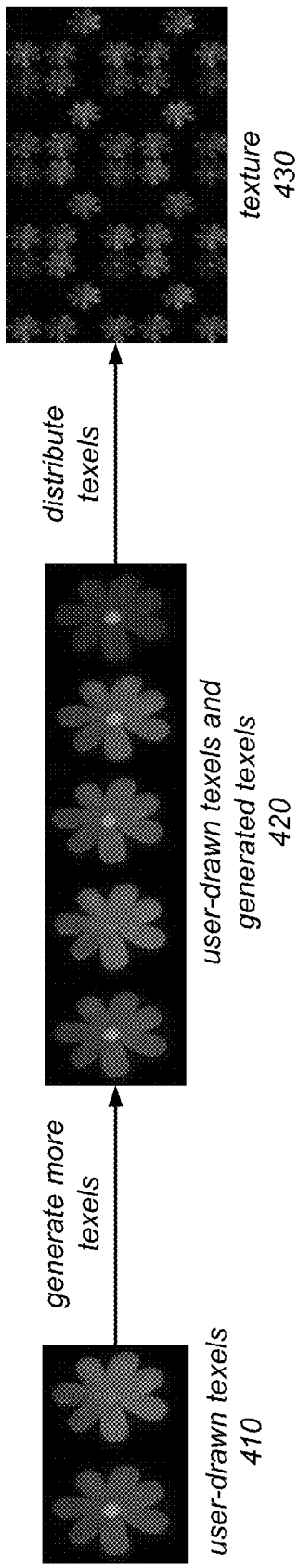
FIG. 4 illustrates the transformation of user-created texels into a complete texture, according to various embodiments.

FIG. 4 illustrates an example in which user-created texels are transformed into a complete texture. In this example, two example texels 410 are drawn by a user. In this example, the example texels 410 have the same shape, but different color values. From these two example texels, three additional texels are generated automatically by further varying the colors, as described above. This results in a collection of five texels 420 to be distributed in the texture map. In this example, the five texels are distributed in a regular pattern, though not in a regular grid, to generate visual texture 430.

In some embodiments, the system described herein may allow a user to model and control texture cues by defining deformation parameters that connect the texture with a vector drawing that includes it. Such texture cues may provide a rich source of information about the shape of an implied 3D surface that supports the texture. In various embodiments, two types of parameters may be considered: global parameters and local parameters. When a texture is modified by global parameters, the entire texture may act as a single entity. Local parameters may affect the distribution lattice vertices and its texels individually. Some examples of global parameters that may be used to deform textures include:

parameters that specify rotations in the X, Y and/or Z axis
parameters that specify translations in the XY plane
parameters that specify a scaling in one or more directions Some examples of parameters that may cause a texture to vary locally include:

lattice spacing and/or distribution
size of texel(s)
orientation of texel(s)

Note that applying a global scaling operation may produce a simultaneous increase (or decrease) in both texel size and grid spacing.

Figure 5A:
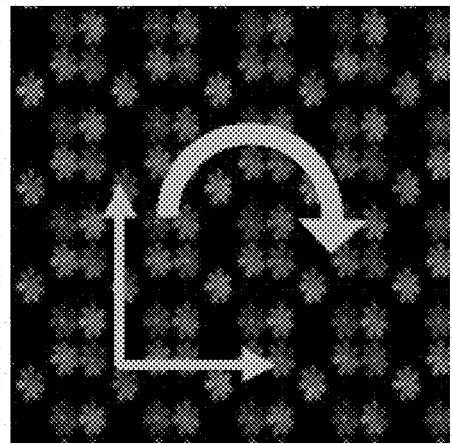
FIGS. 5A-5D illustrate the effects of various texture rotations, according to various embodiments.
Figure 5B:
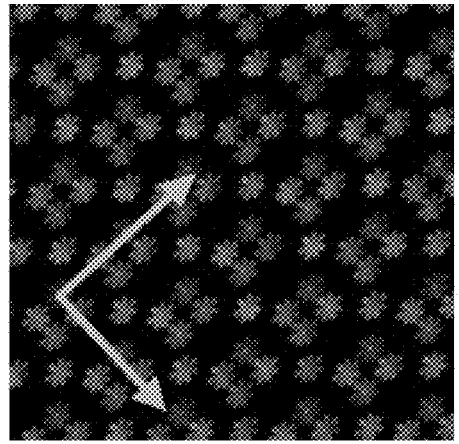
Figure 5C:
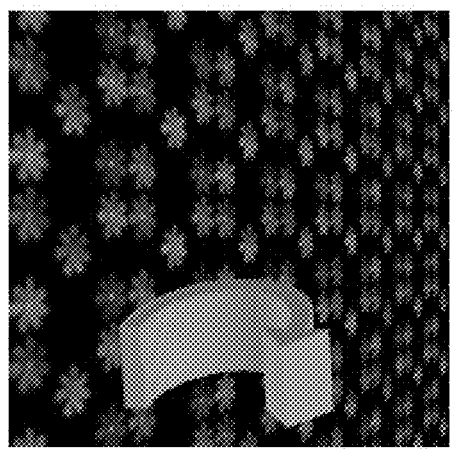
Figure 5D:
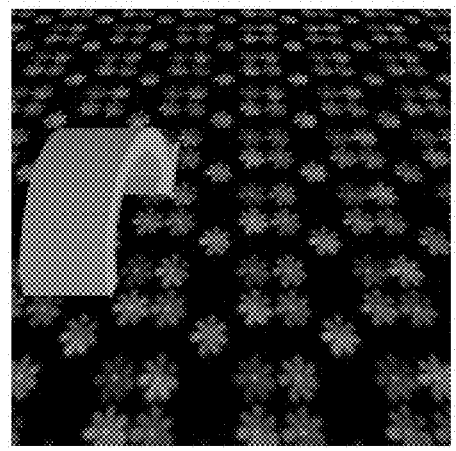
Figures 8A, 8B:
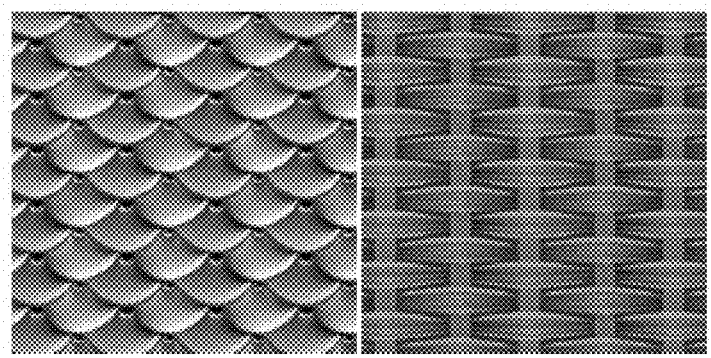
FIGS. 8A-8D illustrate examples of textures that may be designed using the texture map creation tool and methods described herein, according to various embodiments.
Figures 8C, 8D:
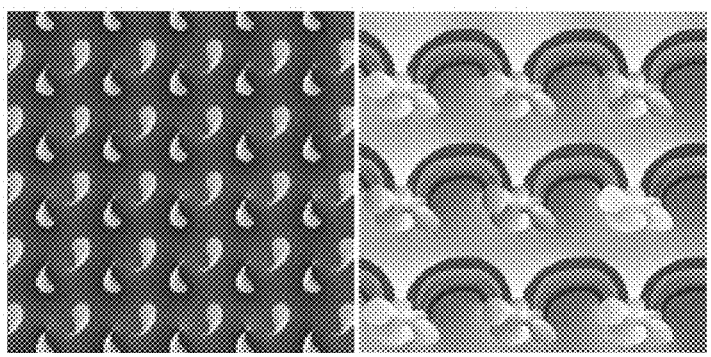

FIGS. 5A-5D illustrate various examples of texture rotations, according to one embodiment. In these examples, FIG. 5A illustrates an original texture on which various rotations may be applied. FIG. 5B illustrates the texture of FIG. 5A, after being rotated around the Z-axis, as indicated by the arrows superimposed over the texture. FIG. 5C illustrates the original texture of 5A after being rotated around the Y-axis, and FIG. 5D illustrates the original texture after being rotated around the X-axis.

FIGS. 6A-6B illustrate an example of texture translation, according to one embodiment. In this example, the original texture of FIG. 6A has been moved in the XY plane to generate the texture in FIG. 6B. In this example, normals and height fields (which may or may not have been derived from those normals) have been used to locally warp the texture. FIG. 7 illustrates an example of the effect of locally varying parameters on a texture, according to one embodiment. In this example, the lattice spacing and the size of the texels of a texture have been varied to create an impression of perspective.

As noted above, the vector texture representation described herein may in various embodiments allow for any kind of distribution. This may include regular textures (e.g., man-made textures where the motif is repeating at regular intervals) and near-regular or uniformly distributed irregular patterns (e.g., natural-looking textures). The system described herein may in some embodiments include support for various methods for creating these distributions, including a grid approach (for the regular patterns), and a uniform randomized method (for irregular and/or near-regular textures). The grid approach may in various embodiments allow a user to define a lattice of regular-shaped, space-filling elements. In several examples described herein, the method may employ a 2D regular grid in which the unit cell is a parallelogram. However, in other embodiments, other lattices or lattice elements may be supported instead of, or in addition to, a regular grid of parallelograms. In some embodiments, a uniform randomized approach may use the relative positioning of user-drawn texels to create connections between neighboring texels and to fill in the allotted region with a random distribution that respects the user-imposed distances between neighbors.

Figure 9C:
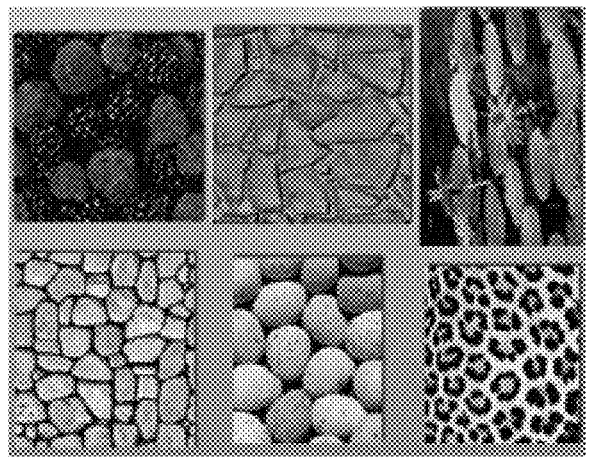
FIGS. 9A-9C illustrate examples of different types of distributions within a texture.
Figure 9B:
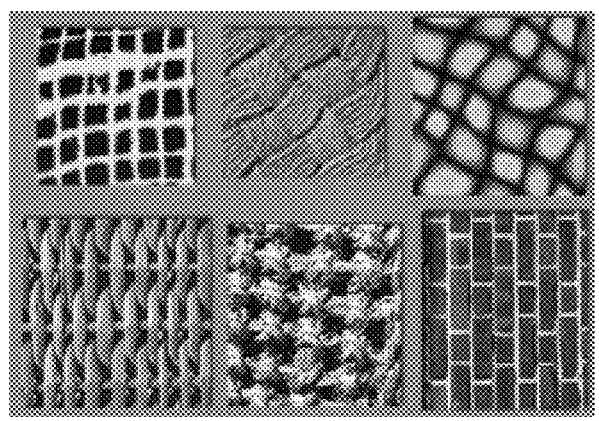
Figure 9A:
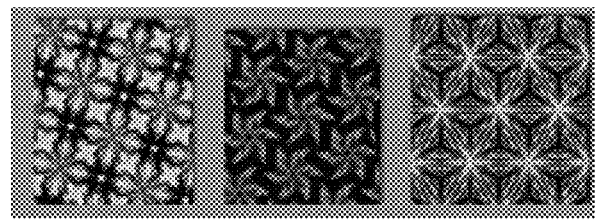

FIGS. 8A-8D illustrate examples of textures that may be designed using the texture map creation tool and methods described herein. These examples range from realistic-looking textures (such as that illustrated in FIG. 8A) to artistic textures (such as that illustrated in FIG. 8D). In this example, the texture illustrated in FIG. 8D may have been generated using random interpolation for shape and colors. FIGS. 9A-9C illustrate examples of regular distributions (FIG. 9A), near-regular distributions (FIG. 9B), and irregular distributions (FIG. 9C), and of which may be created by and/or supported by the system and methods described herein, in various embodiments.

Figure 10A:
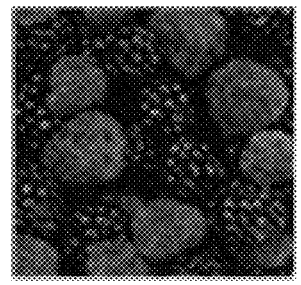
FIGS. 10A-10C illustrate examples of textures in which different types of texture elements appear.
Figure 10B:
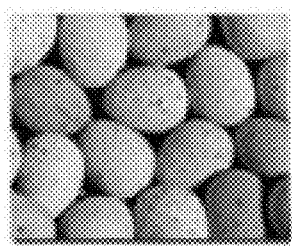
Figure 10C:
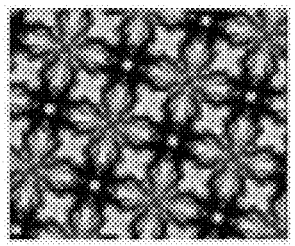

Note that different types of texture elements may appear in the same texture, as shown in the images depicted in FIGS. 10A-10C. In these examples, each texture includes different types of texels. In some embodiments, the system described herein may support the draping of such textures onto 2D images. In some embodiments, the system may support the separation of different texel examples in such textures into groups of texels having a similar appearance. In such embodiments, texels with a similar appearance may be used as example texels to generate new texels for the texture, as described above.

As previously noted, the system described herein may support the use of high-level parameters for indicating the supporting shape of a vector drawing. For example, the visible part of a 3D shape may be described by its normals and its height field. The system may in some embodiments include shape creation tools that allow a user to attach normal and height information to a 2D vector drawing to suggest its shape. Such a representation may be referred to as a 2.5D representation, and may be used to give the impression of shape to texture material and/or supporting vector drawings, in some embodiments. This 2D approach is similar to a 3D method described in U.S. provisional patent applications 61/037,240 and 61/091,262, which are herein incorporated by reference in their entirety. As described therein, such parameters may in some embodiments also be used to compute some shading effects.

Normals may in various embodiments be defined using any suitable interface that allows the user to position a tangent plane for a chosen point to define a 3D direction. In other embodiments, normals may be defined semi-automatically, and the user may only have to specify if the desired shape is convex, concave or flat. In such embodiments, the system may rely on the following assumptions:

In line drawings, the lines represent positions where the surface normal is perpendicular to the eye vector.

The depicted shapes can all be approximated by curved surfaces, with the curvature directed by the 2D gradients of each line.

The first assumption may be described by way of an example. In this example, the lines would be analogous to cut lines seen from one of the poles of a sphere when cutting the sphere at the equator or in a plane parallel to the equator. In some embodiments, this assumption may be generalized such that the surface need not be perpendicular, but that it has the same slope anywhere in the extruded dimension. This is analogous to the cut lines formed when cutting a sphere anywhere on a circle between the equator and the pole.

In this example, heights may be automatically inferred from the normals, but they may be modifiable locally by the user, e.g., using control points on the curves. In some embodiments, normal-manipulation tools, such as those described in U.S. provisional patent applications 61/037,240 and 61/091,262, may be included in the system described herein. In embodiments that employ the supporting diffusion curves vector representation described herein, users may be able to define normals and heights via control points positioned on the Bézier splines (or other geometric control curves or lines).

Figure 11:
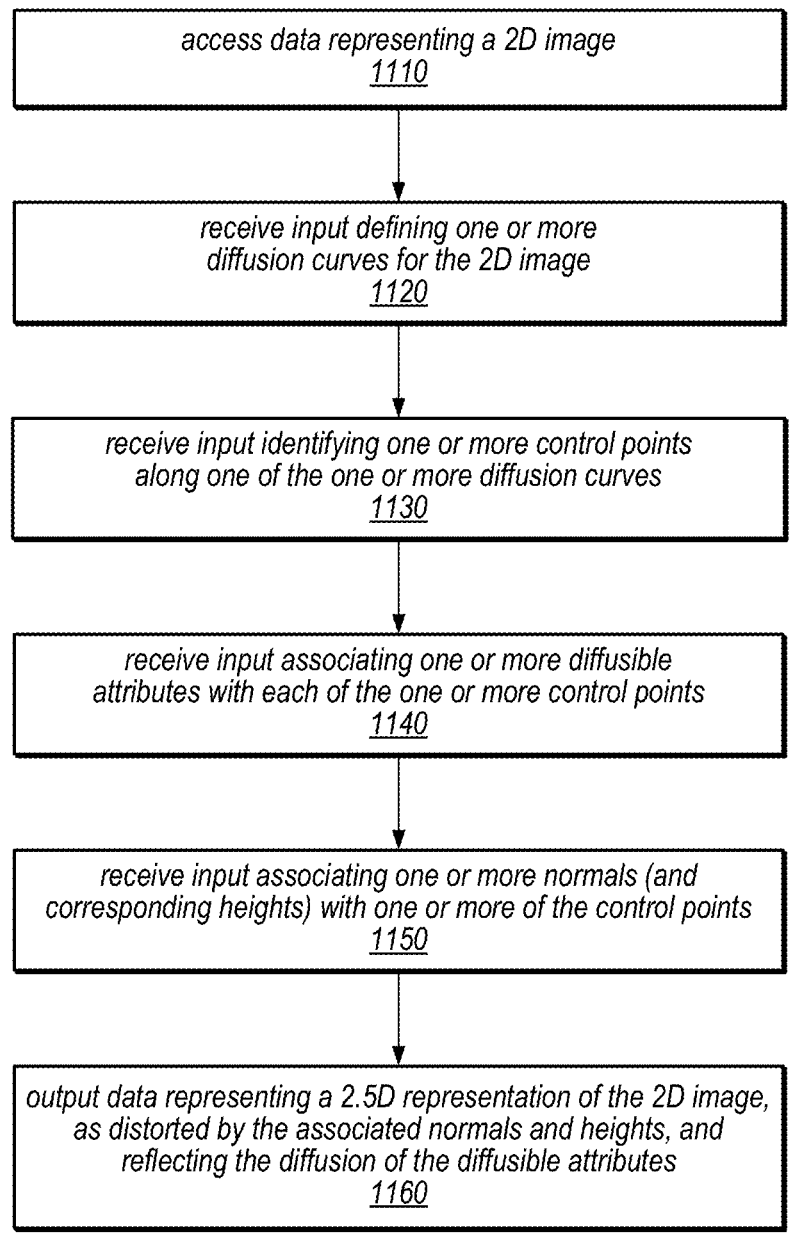
FIG. 11 is a flow diagram illustrating a method for creating a support drawing, according to some embodiments.

As noted above in reference to FIG. 1, a method for adding vector texture to vector graphics images may include creating (e.g., defining and/or generating) a theoretical 3D surface of a support drawing, draping a vectorial texture map on the distorted theoretical surface, and applying a lighting or shading effect to the draped texture. FIG. 11 illustrates a method for creating such a support drawing, according to one embodiment. In this example, data representing the support drawing employs the extensions to diffusion curves described herein. In other words, the support drawing may comprise a vector drawing created using textured vector primitives. The vector curves (Bézier splines) may support control points at which various parameter values are defined. In some embodiments, the representation may include support for all parameters at each control point and the user may optionally decide which parameters are considered active for any given control point. This may allow for a variety of applications ranging from applications through which full drawings may be created from scratch to applications through which textures may be draped over an existing bitmap image, as illustrated in FIGS. 2A-2B.

As illustrated in FIG. 11, a method for creating a support drawing may include accessing data representing a 2D image, as in 1110. This data may be accessed in response to being imported into an application configured for image creation and/or editing, or may be resident in memory accessible to such an application as a result of being imported previously, or as a result of being created and/or modified by the application prior to the desired editing operation. The data accessed may represent a whole image or a portion of an image to which a visual texture is to be applied, in different embodiments. In some embodiment, a user may select a drawing, an image, or a portion of drawing or an image using a GUI of an image editing application.

In this example, the method may include receiving input defining one or more diffusion curves for the 2D image, as in 1120. For example, the method may include receiving input via a GUI of the image editing application indicating one or more geometric curves drawn by a user using a drawing tool of the GUI. These curves may comprise Bézier curves or other parametric curves, in various embodiments. In some embodiments, the method may include receiving input defining the shape of an image element, i.e. shape contour lines, usable to create a 2D drawing representing an existing image, as described above in reference to FIG. 2A.

As illustrated in FIG. 11, the method may include receiving input identifying one or more control points along one of the diffusion curves, as in 1130. For example, the method may include receiving input via a GUI of the image editing application indicating one or more locations within the 2D image at which a user has specified that control points should be attached. In various embodiments, such control points may be attached to the "left" and/or "right" side of the diffusion curve at any position along the curve (i.e. on either side of the curve, using an arbitrary frame of reference).

In this example, the method may include receiving input associating one or more diffusible attributes with each of the control points, as in 1140. For example, the method may include receiving input via a GUI of the image editing application indicating the values of various parameters that a user has specified for the left and/or right side of the curve at each control point. In various embodiments, these attributes may include color and/or blur attributes, as described in more detail below (e.g., with reference to FIGS. 12A-12C).

One advantage of the use of a vector format may be that the attributes attached to diffusion curves (e.g., Bézier splines) may not be restricted to colors and blurs, but may represent other attributes usable in attaching vector textures to vector drawings, as described herein. As previously noted, one useful extension to standard diffusion curves may involve the specification of a normal attribute. The normal attribute may provide both the suggestion of shape and shading support for texture maps (e.g., a bump map effect) and for support drawings, in various embodiments. As with other attributes of diffusion curves, left and right normals and heights may be attached to control points, and may be diffused on each side of the curve, as described below. In some embodiments, normals and heights may be applied to control point dedicated to these attributes, while in other embodiments, these attributes may be attached to control points at which other attributes (e.g., color or blur) are also attached.

As illustrated in FIG. 11, the method may include receiving input associating one or more normals and corresponding heights with one or more of the control points, as in 1150. The specification of normals and corresponding heights represents an extension to the standard diffusion curve approach that may facilitate the techniques described herein for applying vector textures to vector images. In some embodiments, the method may include receiving input via a GUI of the image editing application indicating the values of various parameters of a "normal field" define by a user. In such embodiments, each element in the normal field may include three values (x, y, z) representing the elements of a unit vector (i.e. a vector having a length of one), pointing in the direction perpendicular to an imagined surface at a control point associated with that element of the normal field. Since the normal field only exists in 2D, and many different real surfaces may generate the same normal field in 2D (via projective ambiguity), in some embodiments, this information may be used to reconstruct a plausible 3D surface from the normal field. In some embodiments, default rules or user-specified rules may be applied to resolve any ambiguities.

To simplify the specification of normals along diffusion curves, the method may in some embodiments apply assumptions similar to those applied to previous planar surface inflation methods, such as that the implied surface normal should be oriented along the instantaneous normal along the defining curves. In some embodiments, the method may allow a user to specify the depth-slope of normals to indicate a convex, flat, or concave surface. In some embodiments, in addition to or instead of this high-level control, the user may also be able to choose a "free" mode through which the entire normal vector may be specified. Although normals may be diffused in a manner similar to that used to diffuse other attributes, in some embodiments the normal-vectors may be re-normalized between successive diffusion iterations to ensure unit-length.

In this example, the method may include outputting data representing a 2.5D representation of the 2D image, as distorted by the associated normals and heights, and reflecting the diffusion of the diffusible attributes, as in 1160. For example, the data may be provided to a display component of the image editing application for display of the 2.5D representation of the 2D image or an associated support drawing to the user and/or the data may be stored in an intermediate format by the image editing application for further processing by the application (or another application) or as a final image (e.g., written to main memory, a file, an archive, etc.).

The extended diffusion curve representation described herein may be better understood following a review of standard diffusion curve principles. Standard diffusion curves are geometric curves with various appearance attributes attached, namely color for each of the sides of the space that the curve divides, and blur magnitude to define how quickly color varies across the curve. This image representation may be convenient to use as it allows the sparse definition of colors along a few controlled primitives, while the final image is the result of diffusing these colors outwards and then blurring them according to a similarly diffused blur map. A standard diffusion curve representation may be well suited for producing 2D drawings with smooth and controllable gradients. These gradients are typically controlled by the two attributes described above (color and blur), and are typically used by an artist to manually depict shading and material color variations. A drawing created with diffusion curves may be conceptually thought of as a collection of Bézier splines (or other parametric curves or lines) for which the geometry has been augmented with additional attributes, i.e. two sets of color control points and a set of blur control points, in a standard diffusion curve representation. The color control points correspond to color constraints on the right and left half space of each curve, and the blur control points define the smoothness of the transition between the two sides.

In some embodiments, a diffusion operation may begin with a pre-processing operation that includes interpolating the values of the control points along the geometric curves, e.g., linearly, quadratically, cubically, or using a spline-based interpolation approach. These interpolated values along the curve may in some embodiments be considered "fixed", i.e. they may not be subject to the subsequent diffusion process. In the subsequent diffusion process, each of the curves in the drawing diffuses its respective color(s) on each side of the curve to fill in the empty image space between curves. For example, in all places where attribute values are not explicitly defined (i.e. everywhere except at the immediate left, right, or center of the geometric diffusion curves), attribute values may be computed by taking the explicitly defined values as constraints, and filling in values everywhere else, such that the changes in value from one position to the next are as small as possible. In some embodiments, this problem may be formulated and solved as the solution to a Poisson equation. However, any other process that produces a reasonably smooth interpolation of constraints may also be suitable. These diffused attributes may then be used either directly (e.g. the colors), or as input for further processing (e.g. the blur values of standard diffusion curves, or the normal field of the extended diffusion curves described herein).

Figure 12A:
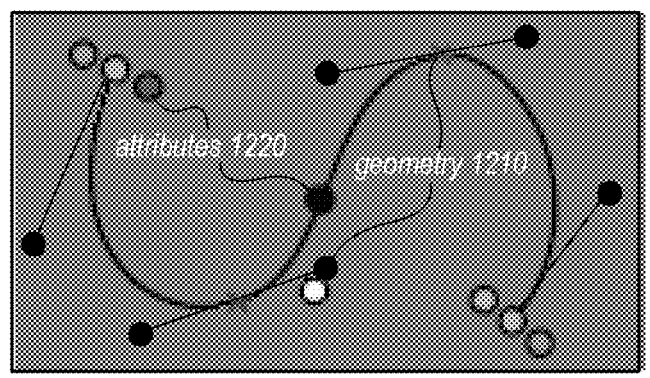
FIGS. 12A-12C illustrate various principles of diffusion curve editing, according to some embodiments.
Figure 12B:
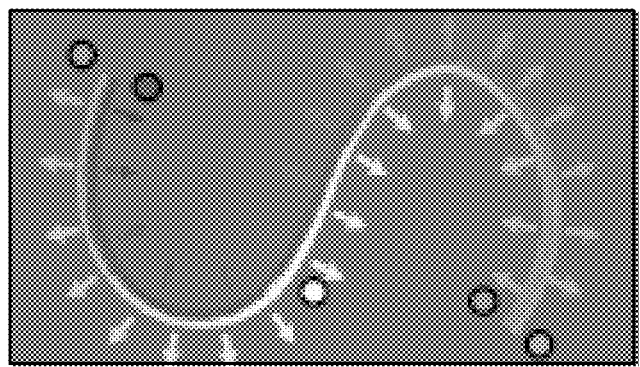
Figure 12C:
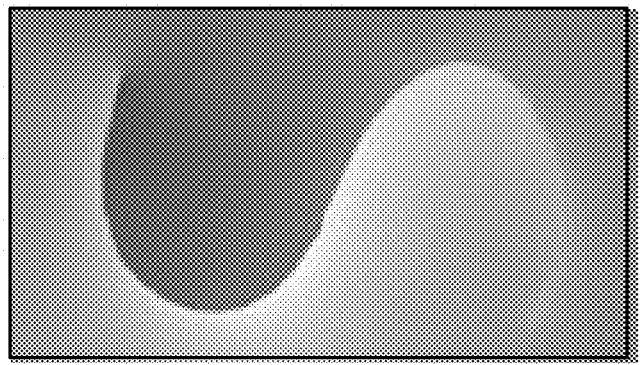

FIGS. 12A-12C illustrate these principles of diffusion curve editing, according to one embodiment. In this example, a typical diffusion curve image is generated by defining geometric curves in terms of geometric parameters 1210 and attributes 1220 along those curves (as in FIG. 12A), interpolating these attributes along the curve, and then diffusing them outward (as in FIG. 12B) to obtain the final image (as shown in FIG. 12C).

In some cases, diffusion curves may be versatile enough to depict even photorealistic image content. As can be seen in the example illustrated in FIGS. 2A-2B, texture features may largely occur along well-defined curves, and may be relatively smooth everywhere else. As described herein, diffusion curves may be extended to support the definition and diffusion of draping parameters for both images (or vector representation) and texture map representations, by leveraging these diffusion concepts. As discussed above, in embodiments employing extended diffusion curves, left and right normals and corresponding heights may be attached as diffusion curve attributes at various control points, and may be diffused on each side of the curve. In some embodiments, the normal diffusion may be slightly different than the color or blur diffusion, because it may only diffuse the X and Y variations of the normal, and may compute Z as $\sqrt{(1-X^2-Y^2)}$. In such embodiments, the heights may depend on the normal variations, and may be computed or approximated from them using any suitable method. The image of normals thus obtained may govern the texture warping and the shading, while the height variations may produce scaling and density variations in the texture. Note that in the example above, the normal is assumed to have unit length (i.e. it is normalized to a length of 1). In general, a normal may be of arbitrary length L. Therefore, Z may generally be computed as $\sqrt{(L^2-X^2-Y^2)}$. As previously described, texel size, texel orientation and/or other local parameters may also be attached as control points on the curves, some embodiments. The specification of these and other parameters may allow a user to imitate texture projections on 3D surface. Different projections may be represented in various embodiments, including parallel projections (oblique projections and orthogonal ones) and perspective projections.

While the use of normal attributes of diffusion curves may in some embodiments facilitate the application of simple shading effects, artistic lighting may involve physically unrealizable shading. In some embodiments the system described herein may include input mechanisms by which a user can manually overlay colors from the supporting diffusion curves to suggest shading. These colors may be disabled by default in textured regions by setting their α-value (i.e. the transparency) to zero.

As described herein, high-level parameters may be provided for the inclusion of texture maps in supporting vector drawings. For example, global affine transformations (e.g., scale, translation, rotation) may permit an artist to quickly place the texture in the desired area. The normal attribute may serve two roles, e.g., in shading, and suggesting surface shape for texture draping. In summary, in addition to the standard diffusion curve parameters (i.e. colors on each side of a Bézier curve and blur along the curve), the extended representation described herein may also include normal and shading attributes. These parameters may be specified along diffusion curves, interpolated, and diffused like the original diffusion curves parameters. In some embodiments, a complete representation of extended diffusion curves may include the following textured vector primitive:

P[ ] array of (x, y, tangent) tuples specifying the Bézier spline;

$C_l$[ ], $C_r$[ ] arrays of (r, g, b, α, t)
  the left- and right-side colors, and their position on the curve Σ[ ] array of (σ, t) the blur values $N_l$[ ], $N_r$[ ] arrays of (x, y, z, t); normals on each side In contrast to color and texture-draping parameters, which may vary anywhere in the image, in some embodiments, there may only be one texture map associated with a given texture region. A characteristic of the standard diffusion curves approach is that it has no concept of regions, and the final attributes (e.g., colors) are defined by the interaction between different curves. Since textures are most commonly defined over a 2D area, the system and methods described herein may define regions by building a planar map on top of the diffusion curves drawing. A texture may then be attached to any of the regions defined by the planar map. In some embodiments, the system may be configured to automatically compute a planar map from the supporting drawing and to allow the user to attach a texture to a planar map region. In some embodiments, a planar map arrangement may be computed from the diffusion curves geometry with the help of a standard or custom library of geometric algorithms, such as the Computational Geometric Algorithm Library (CGAL).

In some embodiments, a user may attach vector texture to closed regions of a vector drawing and only one texture may be defined for one region. In such embodiments, the texture may be tied to the drawing by an anchor point. For example, the artist may specify a point inside the region, and this may also defines the "center" of the texture (e.g., it may identify a point in the region at which a center texel in a design pattern specified by the texture-map may be positioned). In some embodiments, global deformation parameters may allow the user to define the 3D-like position and orientation of the texture. For example, in some embodiments, the anchor point may be moved in the 2D space, which may result in the sliding of the texture on the supporting region. 3D rotations of the texture plane may also be possible by adjusting rotation parameters. Such manipulations may create the impression that the texture is not facing the viewer, but it is viewed sideways, or at an angle. In some embodiments, if the drawing is modified and the planar map is updated, the new image-space coordinates of the anchor point may dictate which new region corresponds to the texture. In such embodiments, if several texture attachment points fall within the same region, the user may be able to select the active texture of each region and/or re-distribute other textures to different regions. In other embodiments, other ways of attaching the texture may be supported, such as attaching the textures to diffusion curves (i.e., the splines) themselves, for example, or combining multiple textures in a region. In still other embodiments, the user may be able to specify textured regions that are not dependent on the vector drawing primitives.

In some embodiments, texture maps may be rasterized before parameters are diffused. However, in such embodiments, the system may still preserve the resolution independence of vector graphics as the rasterization may be recomputed for any given zoom level. During draping, the texture maps may be represented and applied as bitmaps, and may only be re-computed for zooming actions. This may allow the system to achieve real-time rendering and visual feedback, which may otherwise be intractable. This may also serve to decouple the draping system from the texture map representation, allowing the system to handle virtually any texture generation method (e.g., bitmap samples, procedural, etc.) that produces raster output.

Figure 13:
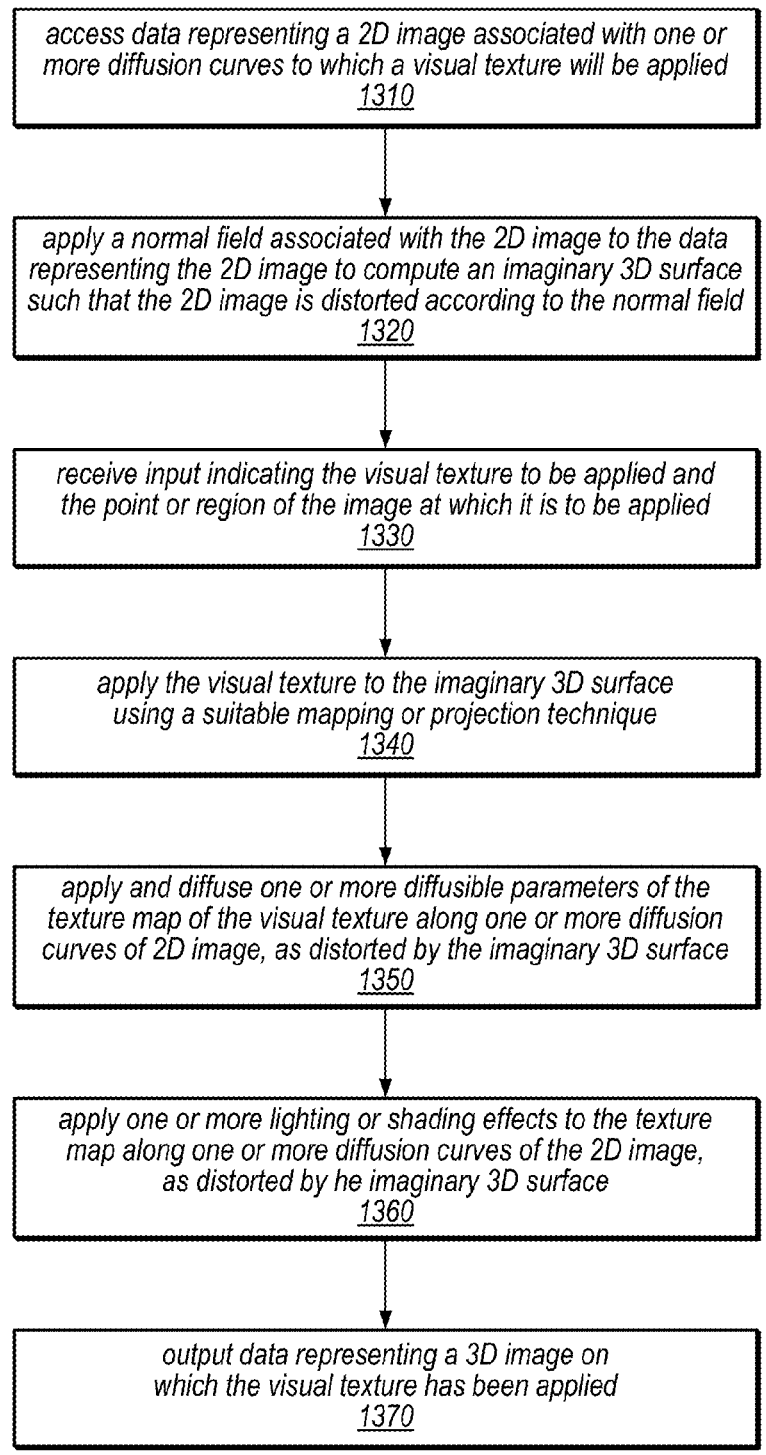
FIG. 13 is a flow diagram illustrating a method for draping a texture onto a 2D image, according to some embodiments.

One method for draping a texture onto a 2D image is illustrated by the flow diagram in FIG. 13. In this example, the method may include accessing data representing a 2D image to which a visual texture is to be applied, as in 1310. As illustrated in FIG. 13, the image may be associated with one or more diffusion curves. For example, the method may in some embodiments include receiving input defining the shape of the diffusion curve(s) and one or more diffusible attributes of the diffusion curve(s), as described herein. In this example, the method may include applying a normal field associated with the 2D image to the data representing the 2D image to compute an theoretical 3D surface, as in 1320. For example, the texture map may be defined in the image plane by a local coordinate frame. The local coordinate frame may specify or define a center of origin (translation), a rotation (around origin), and a scale (magnification around origin). Given no distortions, the local coordinate frame maps a texture map onto the image-plane similar to scaling, rotating, and translating a flat image onto another image. The normal map may be used to compute a theoretical 3D surface corresponding to the 2D image as distorted according to the normal field. For example, the theoretical 3D surface may be constructed by integrating the normal field, or by applying any other suitable method to construct a 3D surface that has the same normal field as the associated normal map. In this example, it is the theoretical 3D surface onto which the texture map is mapped rather than onto a flat image.

As illustrated in FIG. 13, the method may include receiving input indicating the visual texture to be applied and the point or region of the image at which the visual texture is to be applied, as in 1330. For example, in some embodiments, input may be received identifying one of a plurality of textures available for application, and indicating an anchor point within a planar region of the image at which to attach it, as described above.

In this example, the method may include applying the visual texture to the theoretical 3D surface using any suitable mapping or projection technique, as in 1340. For example, in some embodiments, the texture may be mapped onto the theoretical surface using projective texturing, parallax mapping, or a similar technique. In some embodiments, when applying the visual texture, the method may include modifying one or more parameters of the visual texture, e.g., a translation in a specified plane, a rotation around a specified axis, a spacing between atomic texture element instances, a size of one or more atomic texture element instances, or an orientation of one or more atomic texture element instances. The final texture may then mapped be onto the image plane by looking up for every coordinate in the image-plane (x, y) which part of the texture map should be applied. The values between neighboring positions may be interpolated using any suitable interpolation method, such as a nearest neighbor, linear, bi-linear, quadratic, cubic, or spline-based approach, for example.

As illustrated in FIG. 13, the method may include applying and diffusing one or more diffusible parameters of the texture map of the visual texture along one or more diffusion curves of the 2D image, as distorted by the theoretical 3D surface. This is shown in FIG. 13 as 1350. As described above, these diffusible attributes may include a color, blur, normal, or height field attribute specified at one or more points along the diffusion curve.

In this example, the method may include applying one or more lighting or shading effects to the texture map along one or more diffusion curves of the 2D image, as distorted by the theoretical 3D surface. This is shown in FIG. 13 as 1360. For example, this may include adding one or more light-sources to the scene (e.g., point-light sources, directional lights, area lights, etc.) and/or assigning material properties to the theoretical surface. These material properties may depend on the shading model used (e.g., Phong shading, or Gouraud shading, or any other existing or future shading model) and may include (but are not limited to) a reflection coefficient, a refraction coefficient, glossiness, a specular color, a diffuse color. In various embodiments, any of these properties may be made properties of the diffusion curves and designed in the same manner as any other diffusible properties. In some embodiments, a shading or lighting effect may be applied by choosing a camera or viewer in such a way that the camera or viewer sees the current 2D image. In various embodiments, the method may include applying the shading model as a function of added lights, the 3D theoretical surface (including any material properties), and the viewer, to derive a shaded image.

Alternatively, the method may include mixing shading, as described above, with manual coloring, e.g., by assigning an alpha-channel to the color information of the diffusion curves. In such embodiments, the method may include displaying automatically-generated shading where the alpha value is 0, displaying manually-created coloring where the alpha value is 1, and showing a mixture of the two, by interpolating, depending on the value of alpha (assuming an operating range of 0 . . . 1). In other embodiments, other encodings and/or operating ranges may be applied. Linear interpolation may be employed in some embodiments, but any other suitable method may be used in others. Note that the mapping of 0 and 1 described above is arbitrary and may be reversed or otherwise modified without loss of generality.

As illustrated in FIG. 13, the method may include outputting data representing an image on which the visual texture has been applied, according to the normals and/or other diffusible parameters, lighting/shading effects, etc. applied as described above. This is shown in FIG. 13 as 1370. For example, the data may be provided to a display component of an image editing application for display of the texture-draped drawing to the user and/or the data may be stored in an intermediate format by the image editing application for further processing by the application (or another application) or as a final image (e.g., written to main memory, a file, an archive, etc.).

Figure 14A:
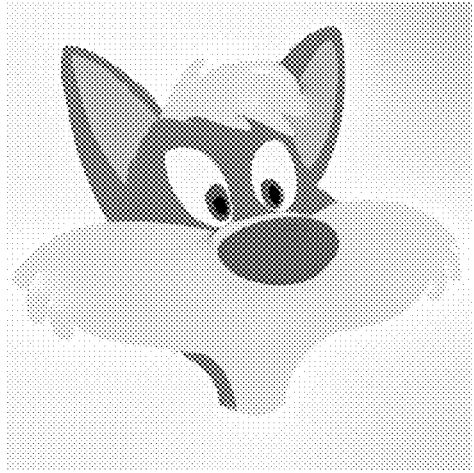
FIGS. 14A-14C illustrate examples of a vector drawing, corresponding normals, and resulting shading, according to one embodiment.
Figure 14B:
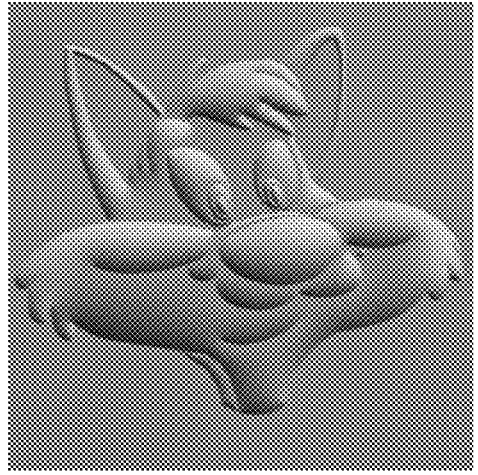
Figure 14C:
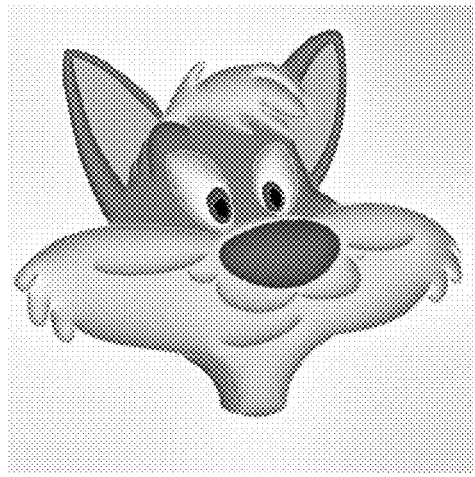

FIGS. 14A-14C illustrate an example of a vector drawing for which normals are defined, and the resulting shading, according to one embodiment. In this example, FIG. 14A illustrates a 2D color drawing. FIG. 14B illustrates normals associated with the color drawing in FIG. 14A. FIG. 14C illustrates the color drawing of FIG. 14A, including shading based on the normals shown in FIG. 14B.

Figure 15A:
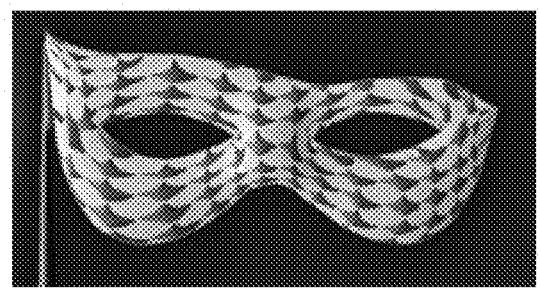
FIGS. 15A-15B illustrate an example of the application of shading effects, according to various embodiments.
Figure 15B:

FIGS. 15A-15B illustrate the application of shading effects, according to various embodiments. In this example, FIG. 15A illustrates a realistic shading effect based on the normals of both a texture map and the support drawing to which it has been attached. FIG. 15B illustrates an artistic shading effect, realized with manual shading controls.

To allow users to re-create the rich appearance variations found in many textures and to apply those textures to drawings and other input images, the system described herein may provide a versatile model based on extensions to diffusion curves, along with support for powerful user interactions. For example, the vector texture design and draping system may provide input mechanisms to support the creation of texels, the creation of a support drawing for an input image, the combination of texels into a texture map representing a texture material, and the draping of the texture map over the input image using normal controls attached to the support drawing. In some embodiments, the system may provide input mechanisms to support optional shading of the final image, either automatically (e.g., using normals), or manually (e.g., using the diffusion curve colors of the supporting drawing).

Figure 16:
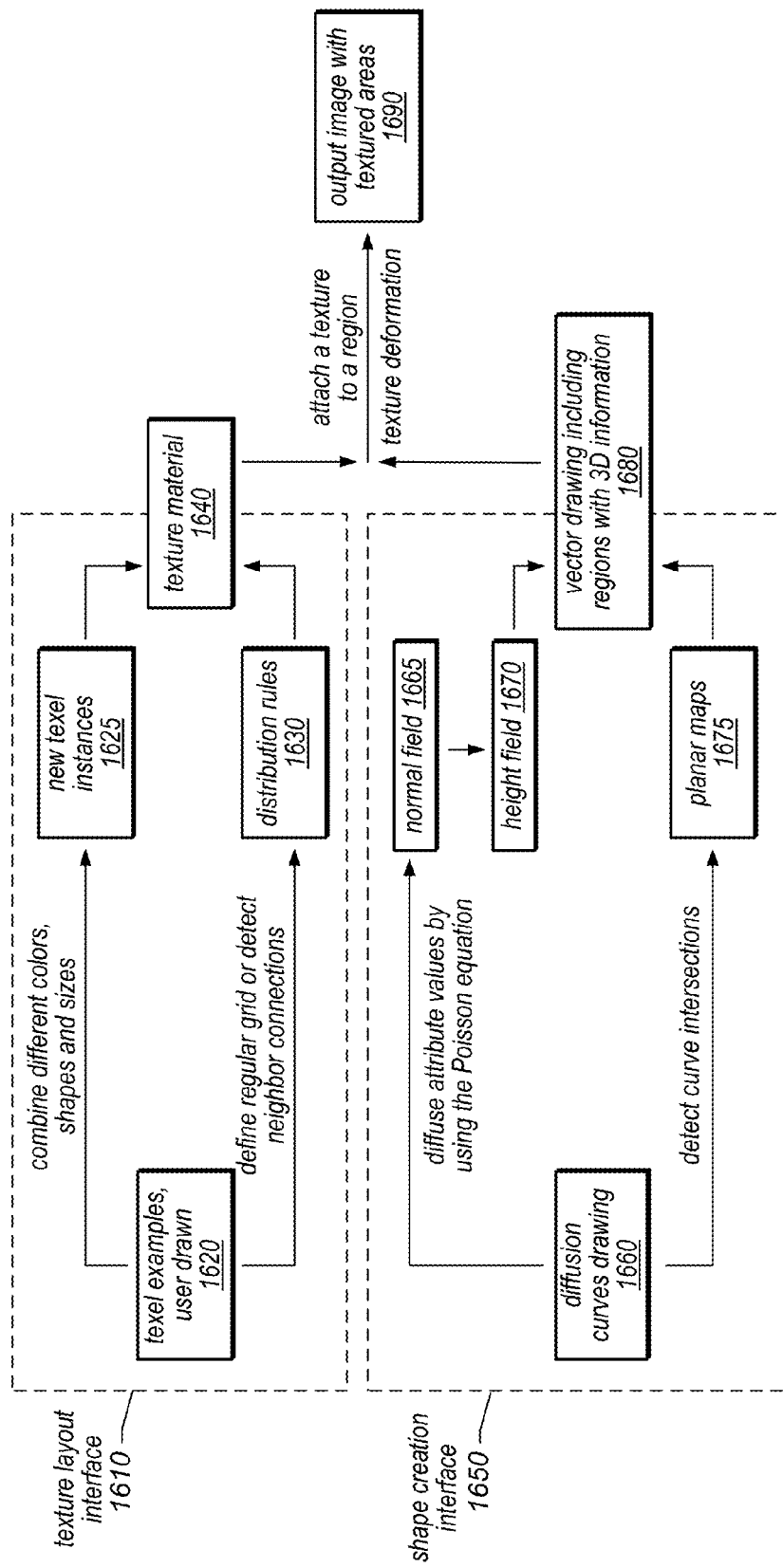
FIG. 16 is a data flow diagram illustrating the use of various user interfaces of a vector texture design and draping system, according to some embodiments.

FIG. 16 is a data flow diagram illustrating an example of the application of the methods described herein through various user interfaces of a vector texture design and draping system. This example illustrates how various user inputs of a vector texture design and draping system may be combined to form texels, texture maps, height-fields, and, ultimately, a final image, according to one embodiment. In this example, one user interface (1610) may provide mechanisms to allow the user to specify the texture layout and another user interface (1650) may provide mechanisms to allow the user to specify the vector drawing shape (i.e. the support drawing). A typical drawing session may begin with the creation of a support drawing and one or more user drawn texel examples. In the example illustrated in FIG. 16, user interface 1610 may include mechanisms to allow a user to draw these texel examples (1620). User interface 1650 may include mechanisms to allow a user to create a vector drawing that includes diffusion curves (1660).

As illustrated in FIG. 16, user interface 1610 may include mechanisms to allow a user to initiate the creation of new texel instances 1625 by specifying the attributes that may be varied to create them from the example texels 1620 (e.g., color, shape, size). User interface 1610 may also include mechanisms to allow a user to generate distribution rules 1630 (e.g., by defining a regular grid and/or detecting neighbor connections). User interface 1610 may also include mechanisms to allow a user to initiate the arrangement of the texels in texture maps representing a texture material (1640).

As illustrated in FIG. 16, user interface 1650 may include mechanisms to allow a user to initiate the diffusion of one or more attributes of the drawing 1660 (e.g., color, blur, normals), and to generate a normal field 1665 (which may in turn initiate the generation of corresponding height field 1670, i.e. derived from normal field 1665). User interface 1650 may also include mechanisms to allow a user to initiate the generation of a planar map 1675. User interface 1650 may also include mechanisms to allow the user to initiate the generation of the support drawing (a vector drawing representing the input image) that includes regions with 3D information from the planar map 1675, normal field 1665, and/or derived height field 1670. This is shown in FIG. 16 as 1680.

In some embodiments, using yet another interface (e.g., a GUI of an image editing application), the user may attach the texture material 1640 to one or more regions of the input image defined by the vector drawing 1680. This interface may also include mechanisms to allow a user to further deform the result (e.g., by adjusting the normals of the support drawing curves) to produce an output image that includes textured areas, shown as 1690.

Note that while many examples of the vector texture design and draping system described herein are based on diffusion curves, the texture draping approach itself is essentially representation-agnostic, and may be applied to other types of textures-maps (e.g. bitmaps) in other embodiments.

Figure 17:
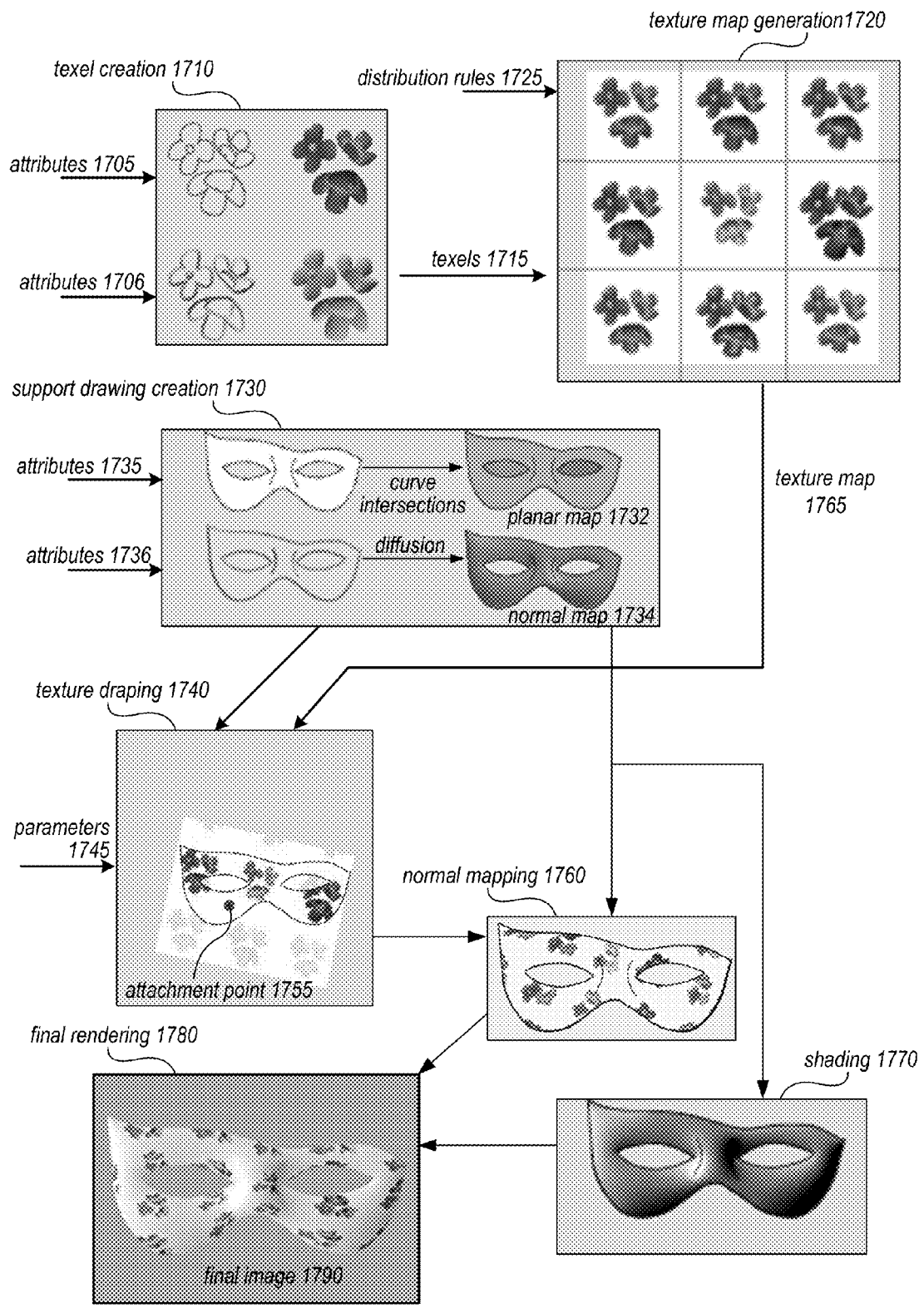
FIG. 17 illustrates a design flow for creating a vector texture representation and applying it to a vector drawing, according to some embodiments.

The vector texture design and draping approach described above in reference to FIG. 16 may be further illustrated by way of the example design flow in FIG. 17, according to one embodiment. In this example, the design begins with texel creation, shown as 1710, which may include the drawing of example texels that include diffusion curves. As described herein, various geometric and/or photometric attributes 1705 may be associated with texels, such as geometry (i.e. shape), color, and/or blur, and these may be attached to control points on the left and/or right sides of various diffusion curves of the texels during texel creation, in some embodiments. In other embodiments, these attributes may be attached to control points of the texels at a later time. These attributes may be varied to automatically create additional texels, as described herein. Additional attributes 1706 (e.g., normals) may also be attached to control points on the left and/or right of diffusion curves of the texels during texel creation, or at another time, in various embodiments.

In this example, a support drawing may be created representing a 2.5D version of a 2D image on which a texture is to be applied, as in 1730. As illustrated in FIG. 17, support drawing creation 1730 may include in its inputs attributes similar to those of texel creation 1710. These inputs are shown as attributes 1735 (e.g., geometry, color, and/or blur) and attributes 1736 (e.g., normals). In some embodiments, a support drawing may be created from scratch in order to generate a textured image, while in others, it may be created as a vector representation of an existing 2D input image, on which textures may be draped. As illustrated in FIG. 17, attributes 1735 (including geometry, for example) may be used during support drawing creation 1730 to generate planar map 1732, according to the intersections of various drawn or existing curves. In this example, attributes 1736 (including normals, for example) may be used during support drawing creation 1730 to generate normal map 1734 (e.g., by diffusion of the normal attributes 1736).

As illustrated in FIG. 17, the outputs of texel creation 1710 (i.e. texels 1715) and various distribution rules 1725 may be inputs to texture map generation 1720. As described herein, distribution rules 1725 may include horizontal and/or vertical spacing rules, in some embodiments. In this example, the output of texture map generation 1720 (i.e. texture map 1765), one or more outputs of support drawing creation 1730 (e.g., planar map 1732), and various parameters 1745 (e.g., translation, rotation, and/or scale parameters) may be inputs to texture draping 1740. As illustrated in FIG. 17, texture draping 1740 may include identification of an attachment point 1755 on the input image or support drawing thereof at which a visual texture represented by texture map 1765 will be attached. As described herein, a visual texture may be applied to an entire input image, or to a portion of an input image (e.g., a region of the image defined by one or more curves). Texture draping 1740 may include mapping the texture map onto the support drawing in accordance with planar map 1732 and parameters 1745, in some embodiments.

As illustrated in FIG. 17, the output of texture draping 1740 (i.e. an image in which at least a portion of the image is draped with the visual texture), and one or more outputs of support drawing creation 1730 (e.g., normal map 1734) may be inputs to normal mapping 1760. In this example, normal mapping 1760 may include distorting the image (or portion thereof) draped with the visual texture according to normal map 1734, as described herein. As illustrated in FIG. 17 and described herein, normal map 1734 may also be an input to shading 1770. In this example, shading 1770 may include applying a light source and/or parameters of a light source, along with normal map 1734, to determine a shading effect. As illustrated in FIG. 17, final rendering 1780 may generate a final image 1790, based on the results of shading 1770 and normal mapping 1760. In this example, final image 1790 may represent a 2.5D version of the 2D input image, on which a texture has been draped and then deformed, according to various parameters associated with texture map 1765 and the support drawing created at 1730.

Figure 18A:
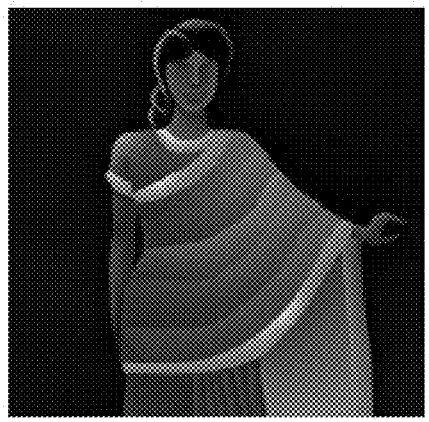
FIGS. 18A-18G illustrate various inputs and outputs of a vector texture design and draping system, according to some embodiments.
Figure 18B:
Figure 18C:
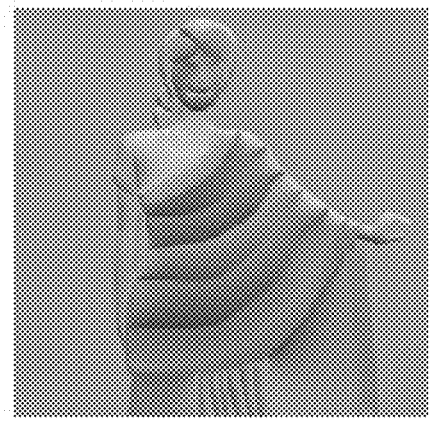
Figure 18D:
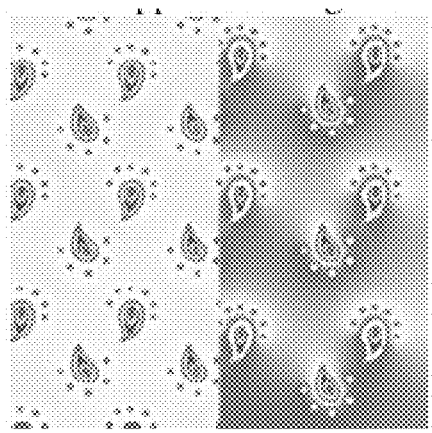
Figure 18G:
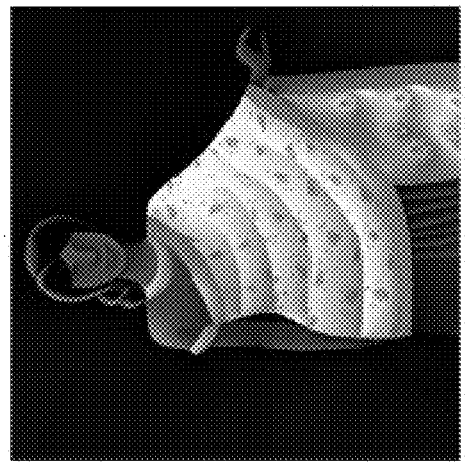
Figure 18F:
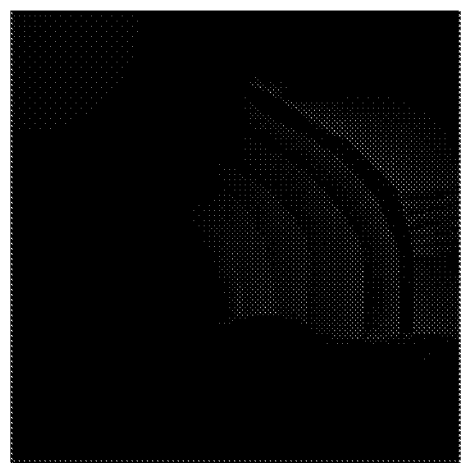
Figure 18E:
Figure 19A:
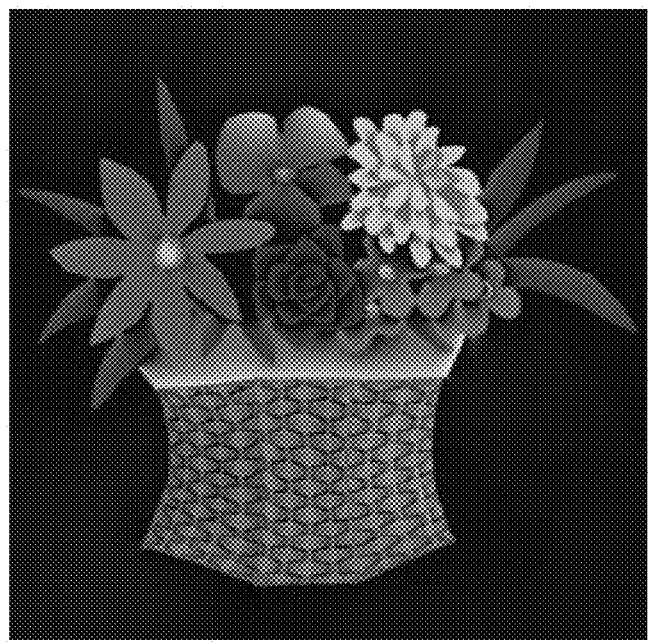
FIGS. 19A and 19B illustrate examples of shading using a normal map and manual shading, respectively.
Figure 19B:

In another example, FIGS. 18A-18D, and 18F illustrate various inputs used to create a complete drawing using a vector texture design and draping system, and FIGS. 18E-18G illustrate corresponding outputs of the system, according to one embodiment. In this example, FIG. 18A illustrates a support drawing, FIG. 18B illustrates a planar map, FIG. 18C illustrates a normal map, FIG. 18D illustrates a texture map, and FIG. 18F illustrates a drawn shading map. In this example, FIG. 18E illustrates a final image in which automatic shading has been applied (e.g., according to the normal map illustrated in FIG. 18C), while FIG. 18F illustrates a final image based on manual shading (e.g., according to the drawn shading map illustrated in FIG. 18F). In yet another example, FIGS. 19A and 19B illustrate examples of shading using a normal map and manual shading, respectively.

In some embodiments, the system described herein may support a user-configurable warp parameter. Given the normal map computed from the normal parameters, this warp parameter may scale the inflation amount of the surface implied by the normals. In some embodiments, the system may employ a parallax mapping technique, which warps the texture to give the impression of parallax foreshortening. For example, given a texture applied to a flat polygon (e.g., an image rectangle), parallax mapping may offset each texture coordinate to suggest complex surface shape. In some embodiments, a height-field may be computed from the normal map. As with other functionality of the system, a Poisson equation may be solved for this purpose. In this example, for an image pixel (x, y) with an initial texture coordinate $(u_0, v_0)$ and height value h, the final texture coordinate may be computed as $(u, v) = (u_0; v_0) + h \cdot V_{x,y}$, where $V_{x,y}$ are the x and y values of the eye vector. Because positive heights make the texture appear closer to the viewer, thus up-sampling it, this may ensure that texture deformation artifacts are minimized by rendering the texture at the maximum height, and considering the image plane at height 0.

As previously noted, the system described herein may support a single texture per planar map region. While this may be particularly useful and convenient for the regular and near-regular textures that are the focus of many of the examples included above, this approach may not extend easily to mixed texture approaches. In some embodiments, an alternate approach may be to attach texture synthesis attributes to diffusion curves directly, diffuse these outwards and have textures grown dynamically. In addition to supporting the regular and near-regular textures described above, in some embodiments the vector representation described herein may be extended to support irregular, procedural, synthesized and stochastic textures. The draping methods described herein may in some embodiments be applied to texture maps of any of these texture types. However, there may be differences in the way the corresponding diffusion curve texture maps are created, in these cases. For example, for irregular texture maps, learning approaches and/or procedural texture algorithms may be reformulated to directly generate extended diffusion curves as output. In other cases, bitmap output of textures may be vectorized, or synthesized at the required magnification level and applied directly as bitmaps. In some embodiments, given the resolution independence of a vector-based representation level-of-detail considerations and hierarchical textures may be employed with interesting results. In still other embodiments, the system described herein may include support for automatic texture vectorization from photographs. This may include detection and analysis of textures and shape-from-shading (normals). Alternatively, some embodiments, may support a user-assisted approach, which may yield convincing solutions.

Figure 20:
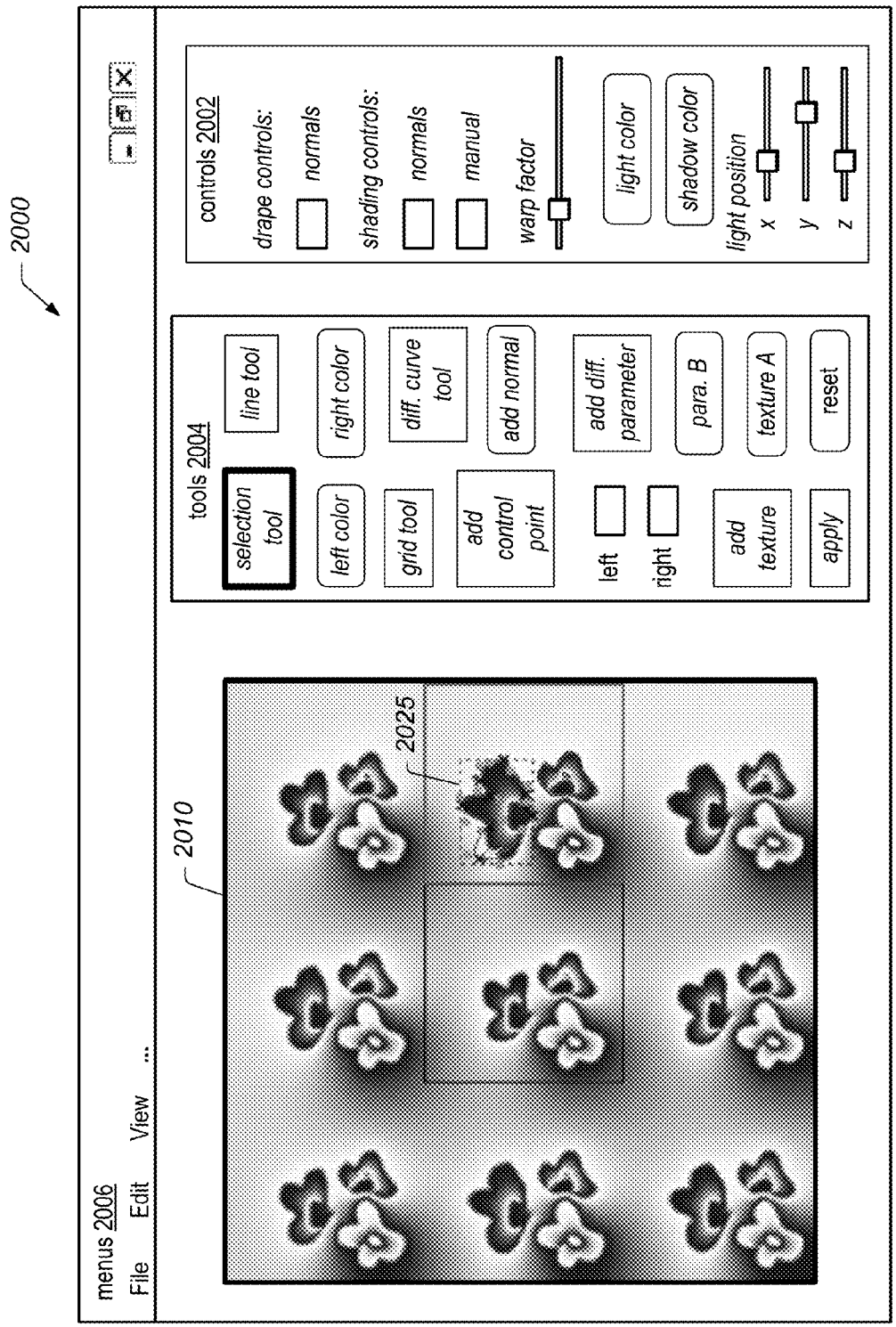
FIGS. 20-22 illustrate a graphical user interface of an image editing application configured to support adding vector texture to vector graphics images, according to some embodiments.

In different embodiments, a system configured to perform the image editing operations described herein may provide various input mechanisms with which the user may indicate selections and/or input values for various parameters. For example, in some embodiments, an image editing application providing the functionality of the vector texture design and draping system described herein may include a graphical user interface (GUI), which may present selection tools, slider bars, pop-up menus, pull-down menus, dials, text entry boxes, or other mechanisms for identifying selected images or portions thereof, for selecting image editing operations to be applied to these images or portions thereof, or for specifying values or relative values of various configurable parameters. For example, FIG. 20 illustrates a GUI of an image editing application (or image editing module of another type of application) that may provide mechanisms for a user to apply the image editing techniques described herein to create vector textures and support drawings, to drape vector textures onto support drawings, and to specify and/or modify one or more parameters of these operations, according to one embodiment. In this example, interfaces of a texture creation module, shape creation module, and/or a texture draping module may provide one or more user interface elements whereby a user may select and control the application of the image editing techniques described herein. The user interface may also provide user interface elements for controlling various aspects of other image editing operations and/or for performing other image-related tasks. The user interface illustrated in FIG. 20 is provided as an example of one possible implementation, and is not intended to be limiting.

FIG. 20 illustrates an example display 2000 depicting various frames that may be visible to a user during an image editing operation. In this example, the display is divided into four regions or areas: menus 2006, tools 2004, controls 2002, and active editing window 2010. As illustrated in FIG. 20, tools 2004 and controls 2002 may include one or more user-selectable and/or user-modifiable interface elements, such as slider bars, dials, pop-up menus, alphanumeric text entry boxes, check boxes, etc., for specifying various operations to be applied to an image, a vector support drawing, a texel, or a texture map and/or for specifying parameters of those operations. For example, tools area 2004 of the GUI may contain the user interface elements that are selectable to apply various editing operations to an image or to a vector drawing representing an image (e.g., drawing diffusion curves, adding control points on the left and/or right side of the curves, adding diffusible parameters at one or more control points, adding normals at one or more control points, applying a texture, etc.), as shown in FIG. 20.

In the example illustrated in FIG. 20, the user may be in the process of creating the texture map illustrated in image editing window 2010. In this example, the user has chosen a "selection tool" from tools area 2004, as indicated by the dark border around the user interface element "selection tool", and has used this selection tool to select a portion of a texel instance within the texture map being edited in active editing window 2010. The user may have selected the texel element by defining an approximate bounding box 2025 around the texel element using the selection tool of tool area 2004 (e.g., using a mouse, touch pad, keyboard, track ball, etc. to move a cursor across the image to draw bounding box 2025). In this example, the user may edit the shape of the selected texel element by stretching or compacting bounding box 2025, resulting in a change in the geometric (i.e. shape) data for the corresponding texel instance. As described herein, changing the geometric data of an example texel may enable the automatic or user-initiated creation of additional texels in which the shape data values are interpolated values based on those of the example texels. In this example, the input mechanisms illustrated in FIG. 20 may also be used to create new texels or texel elements, to add color(s), to specify distribution rules (e.g., using a "grid tool"), or to perform other operations as part of a texture creation operation.

Figure 21:
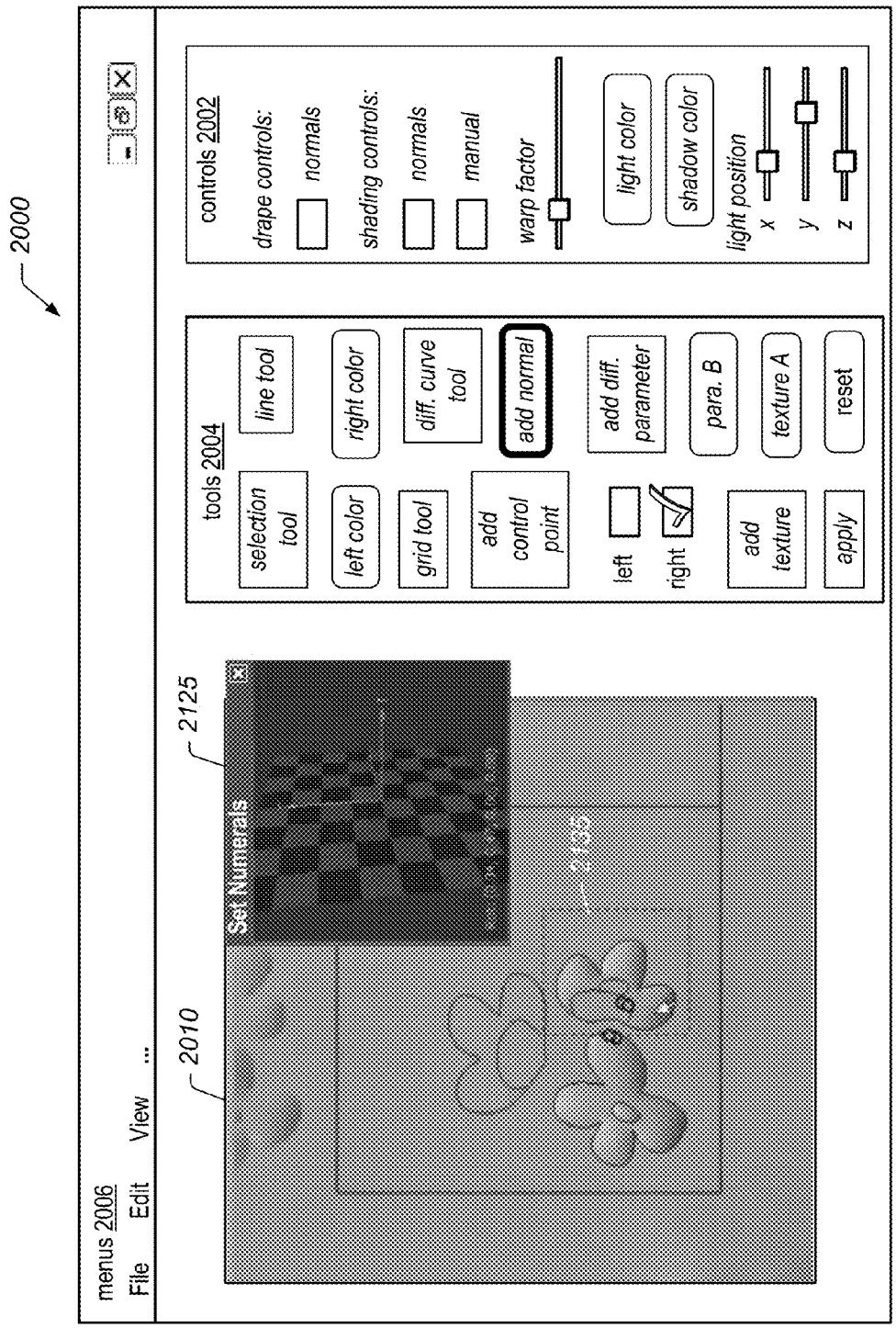

FIG. 21 illustrates display 2000 during a different image editing operation supported by the vector texture design and draping system described herein. In this example, the user may be in the process of adding one or more normals to a selected texel element, as indicated by the dark border around the user interface element "add normal" in tool area 2004. In this example, the user is adding a normal to the right side of a diffusion curve at a selected control point of a texel element within bounding box 2135, as indicated by the check box "right". The user may have selected this control point using the selection tool in tools area 2004, or by another means, in different embodiments. The user may have added the selected control point in a previous operation of the current editing session (e.g., using the "add control point" element of tools area 2004), or this control point may have been added to the information associated with the texel at another time, in various embodiments. In this example, in response to selection of the "add normal" tool in tools area 2004, another user interface (i.e. pop-up window 2125) has been displayed. As the user specifies or modifies the normal (e.g., by movement of a mouse, touch pad, keyboard, track ball, etc., or using the "warp factor" slider bar in controls area 2002), pop-up window 2125 may display an indication of the normal at the selected control point, as illustrated in FIG. 21.

Figure 22:
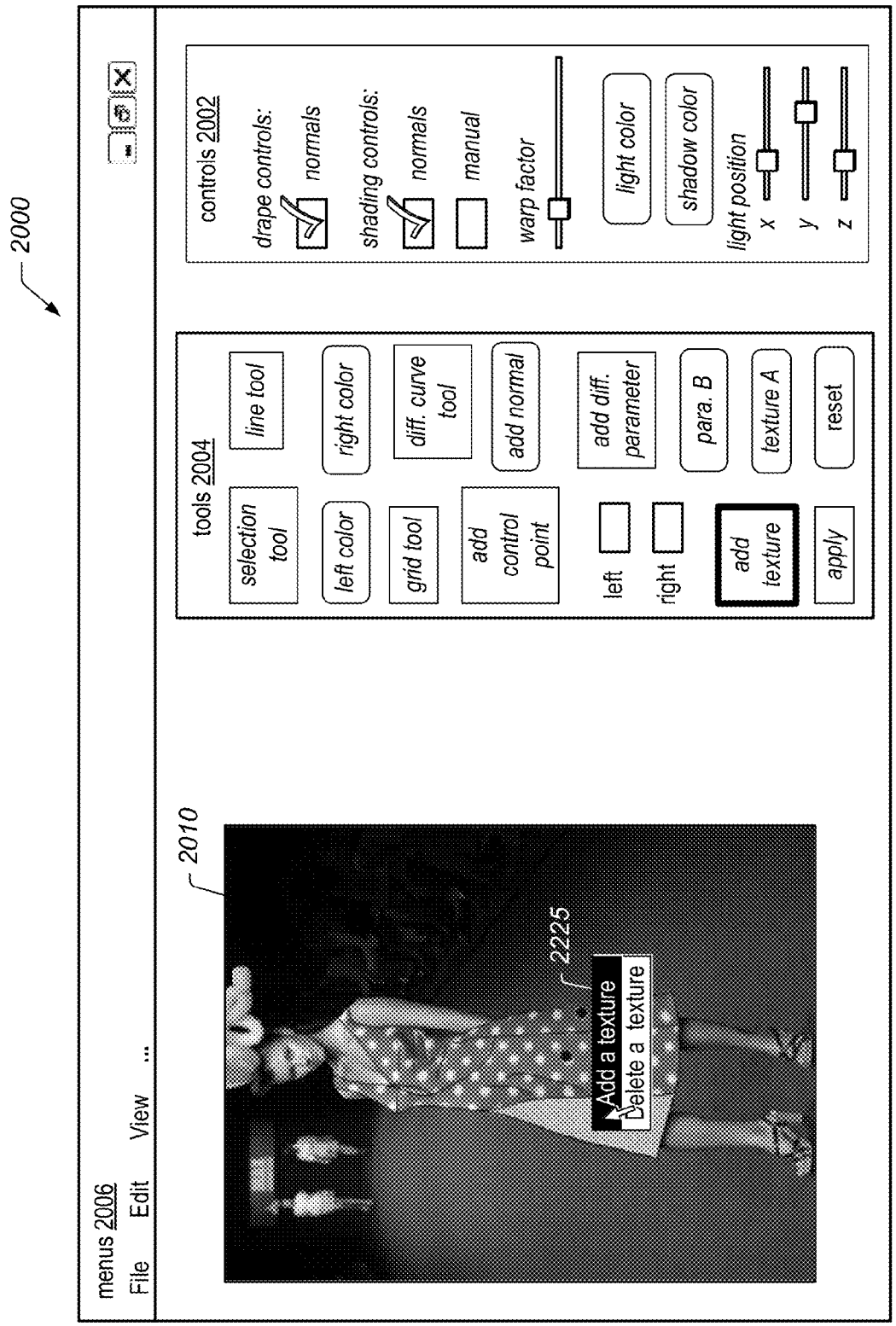

FIG. 22 illustrates display 2000 during a different image editing operation supported by the vector texture design and draping system described herein. In this example, the user may be in the process of adding a texture to the image depicted in active editing window 2010, as indicated by the dark border around the user interface element "add texture" in tool area 2004. In this example, the user may have selected the "add texture" element and may have been prompted to select a region of the image in which to apply a texture, or the user may have selected a region of the image on which to apply an operation and then the operation to be applied (i.e. "add texture"). In this example, three different regions have been defined by a planar map for the input image (which is similar to that illustrated in FIGS. 2A and 2B), and the user has selected one of these regions for the application of a texture. In this example, in response to selection of the element "add texture", an additional user interface (i.e. pop-up window 2225) is displayed, through which the user may choose to add an exiting texture (as in this example) or to create a new texture to be added to the image. In this example, the user may be able to select an existing texture from a palette of available textures using a pull-down menu, pop-up menu, or other input mechanism (illustrated in FIG. 22 as "texture A" in tools area 2004). In this example, texture A may be applied to the selected region of the image using normals, as indicated by the selection of the drape control check box "normals" in controls area 2002.

As described above, when adding a texture to a vector drawing representing a 2.5D image, the user may also be able to add a lighting or shading effect, in some embodiments. In the example illustrated in FIG. 22, shading control check boxes are provided for specifying whether a shading effect will be automatically generated (e.g., using normals) or manually added, and slider bars are provided for specifying a light position (in the x, y, and z planes) for the shading effect. In this example, the user has selected automated shading using normals. As illustrated in FIG. 22, in some embodiments, the user may be able to specify a light color and/or a shadow color for a lighting or shading effect using interface elements in controls area 2002.

As illustrated in FIGS. 20-22, other operations may be selected using interface mechanisms in tools area 2004, such as a reset function. In various embodiments, the reset tool illustrated in FIGS. 20-22 may or may not be included in the user interface. Various embodiments may include other tools not shown as well, such as an "undo" tool that undoes the most recent user action in active editing window 2010.

In the example GUI illustrated in FIGS. 20-22, menus 2006 may include one or more menus, for example menus used to navigate to other displays in the image editing application, open files, print or save files, undo/redo actions, view one or more selected representations of images, and so on. In some embodiments, an image representation (e.g., a file containing image data, support drawing data, texture data, metadata, etc.) may be identified by the user through the "file" option in menu area 2006. This menu item may include, for example, a user-selectable pull-down option for importing images or textures from an identified file. In the example GUI illustrated in FIGS. 20-22, active editing window 2010 is the area in which an image or texture being created or modified is displayed as various editing operations are performed. In various embodiments and at various times, active editing window 2010 may display a portion or all of an original input image to which an editing operation is to be applied, an original vector drawing or one representing an input image, a texel or texture map, a portion or all of preview result image, an output image, or any intermediate image produced as part of the image editing operations described herein.

In the example GUI illustrated in FIGS. 20-22, menu 2006 includes a "view" option. This menu item may include, for example, a user-selectable pull-down or pop-up menu usable to select which of various representations of an image are displayed in active editing window 2010, or in another area of display 2000. In other embodiments, different input mechanisms may be provided for selecting a view to be displayed, such as one or more radio buttons, alphanumeric text boxes, dials, etc. In some embodiments, one of the available viewing options may be a "split view", in which two or more representations of an image may be simultaneously displayed (e.g., an input image and corresponding vector support drawing may be displayed while the user iteratively applies an editing operation). In some embodiments, as the user iteratively applies the techniques described herein, the system may be configured to automatically update and/or store the data representing these modified image views. The system may also be configured to automatically refresh the images being displayed in response to these updates.

In some embodiments, a user may be prompted to provide one or more of the inputs described above in response to invoking an operation of the image editing application. In other embodiments, the image editing application may provide default values for any or all of these inputs. In some embodiments, the user may be allowed to override one or more default parameter values using an interface similar to that illustrated in FIGS. 20-22.

Some embodiments may include a means for creating textures for subsequent application to image elements or portions thereof. For example, a texture creation module may present an interface through which texels and/or texture distribution rules may be specified, may create texels and/or texture maps based on user input, and may store data representing various texels and/or texture maps for subsequent use, as described herein. The texture creation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform presenting an interface through which texels and/or texture distribution rules may be specified, creating texels and/or texture maps based on user input, and storing data representing various texels and/or texture maps for subsequent use, as described herein. Other embodiments of the texture creation module may be at least partially implemented by hardware circuitry and/or firmware stored, for example, in a non-volatile memory.

Some embodiments may include a means for creating shapes representing image elements or portions thereof. For example, a shape creation module may present an interface through which shapes may be specified (e.g. by defining one or more diffusion curves) and through which one or more diffusible attributes of those diffusion curves may be specified, may generate data representing one or more shapes dependent on user input, and may store the data representing the one or more shapes for subsequent use, as described herein. The shape creation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform presenting an interface through which shapes may be specified (e.g. by defining one or more diffusion curves) and through which one or more diffusible attributes of those diffusion curves may be specified, generating data representing one or more shapes dependent on user input, and storing the data representing the one or more shapes for subsequent use, as described herein. Other embodiments of the shape creation module may be at least partially implemented by hardware circuitry and/or firmware stored, for example, in a non-volatile memory.

Some embodiments may include a means for applying textures to image elements or portions thereof. For example, a texture draping module may generate a planar map defining one or more regions of a 2D image, generate data representing a theoretical 3D surface representation of the image, map or project a visual texture onto a selected portion of the image or onto the theoretical 3D surface, and store data representing an output image in which the visual texture is draped over the selected portion of the image for subsequent use, as described herein. In some embodiments, the texture draping module may receive input specifying a value of one or more texture parameters of the visual texture, and may modify the visual texture in accordance with the received input. The texture draping module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform generating a planar map defining one or more regions of a 2D image, generating data representing a theoretical 3D surface representation of the image, mapping or projecting a visual texture onto a selected portion of the image or onto the theoretical 3D surface, and storing data representing an output image in which the visual texture is draped over the selected portion of the image for subsequent use, as described herein. In some embodiments, the computer-readable storage medium may store program instructions executable by the one or more processors to cause the computing apparatus to perform receiving input specifying a value of one or more texture parameters of the visual texture, and modifying the visual texture in accordance with the received input, as described herein. Other embodiments of the texture draping module may be at least partially implemented by hardware circuitry and/or firmware stored, for example, in a non-volatile memory.

Some embodiments may include a means for applying lighting and/or shading effects to image elements or portions thereof. For example, a lighting/shading module may apply a shading or lighting effect to a 3D representation of the image (or to a selected region thereof) dependent on a diffusible attribute (e.g., a normal attribute) of the texture map or of a selected region of the image, a light source applied to the image, a shading model, a camera parameter, and/or a viewer parameter, and may store data representing an output image exhibiting the lighting or shading effect for subsequent use, as described herein. The lighting/shading module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform applying a shading or lighting effect to a 3D representation of the image (or to a selected region thereof) dependent on a diffusible attribute (e.g., a normal attribute) of the texture map or of a selected region of the image, a light source applied to the image, a shading model, a camera parameter, and/or a viewer parameter, and storing data representing an output image exhibiting the lighting or shading effect for subsequent use, as described herein. Other embodiments of the lighting/shading module may be at least partially implemented by hardware circuitry and/or firmware stored, for example, in a non-volatile memory.

Figure 23:
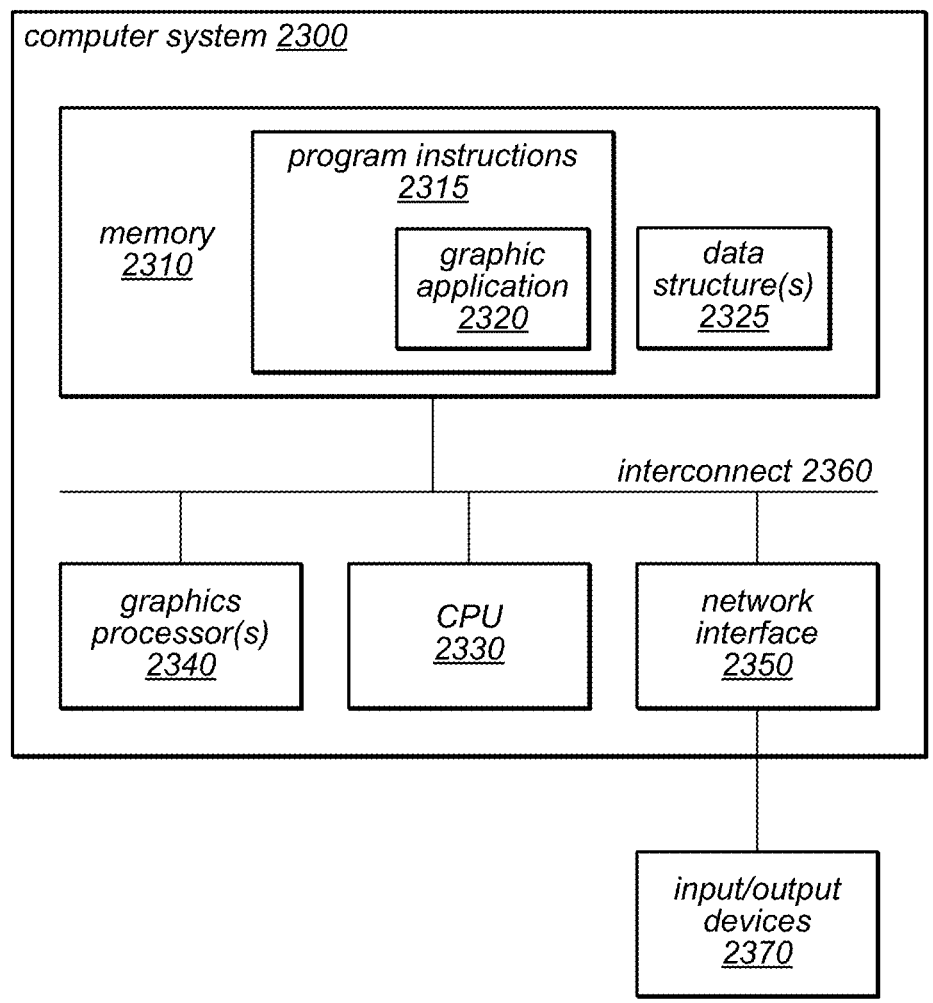
FIG. 23 is a block diagram illustrating one embodiment of a computer system configured to implement a vector texture design and draping system, as described herein.

The methods described herein for adding vector texture to images in image editing operations (e.g., within a graphics application) may be implemented by a computer system configured to provide the functionality described. FIG. 23 is a block diagram illustrating one embodiment of a computer system 2300 configured to implement such image editing operations. A graphics application such as graphics application 2320 may be configured to perform various image editing functions and to render new images accordingly. In some embodiments, a user may invoke operations to add, move or remove objects, resize objects or entire images, create, remove, or modify texture-maps and/or textures of objects in an image, or otherwise alter an input image through a user interface of graphics application 2320. Graphics application 2320 may be configured to perform these operations and may employ the methods described herein for adding vector texture to images. Graphics application 2320 may be configured to render the output image to a separate window, or directly into the same frame buffer containing the input image, in different embodiments.

Graphics application 2320 may represent various types of graphics applications, such as painting, publishing, photography, games, animation, and other applications. Graphics application 2320 may include one or more components comprising program instructions that when executed on CPU 2330 and/or GPU 2340 cause computer system 2300 to perform the texture creation, shape creation, texture draping, and other image editing functions described herein (e.g., to implement a texture creation module, a shape creation module, a texture draping module, a lighting/shading module, and/or a graphical user interface through which inputs may be provided to these modules, as described herein). Additionally, graphics application 2320 may utilize a graphics processor 2340 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 2340 may implement a number of graphics primitive operations in a way that makes executing them much faster than drawing directly to the screen with a host central processing unit (CPU), such as CPU 2330. In various embodiments, the methods disclosed herein may be implemented by program instructions configured for parallel execution on one or more such GPUs. The GPU 2300 may implement one or more application programmer interfaces (APIs) that permit programmers to invoke the functionality of the GPU. Suitable GPUs may be commercially available from vendors such as NVIDIA Corporation, ATI Technologies, and others.

Note that functionality and/or features described herein as being part of, or performed by, graphics application 2320 may, in some embodiments, be part of, or performed by, one or more graphics processors, such as graphics processor 2340. As described above, in some embodiments graphics application 2320 may be configured to render modified images into a different window than input images.

An image editing application that implements the methods described herein for adding vector texture to images may be implemented on various types of computer systems. Referring again to FIG. 23, computer system 2300 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 2320, which may be configured to implement adding vector texture to images, as described herein, may be provided as a computer program product, or software, that may include a computer-readable storage medium having stored thereon instructions, which may be used to program a computer system (or other electronic devices) to implement image editing using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 23, computer system 2300 may include one or more processor units (CPUs) 2330. Processors 2330 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 2300, such as various versions of Unix, Linux, Windows™ from Microsoft Corporation, MacOS™ from Apple Corporation, or any other operating system that enables the operation of software on a hardware platform.

The computer system 2300 may also include one or more system memories 2310 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 2300 via interconnect 2360. Memory 2310 may include other types of memory as well, or combinations thereof. One or more of memories 2310 may include program instructions 2315 executable by one or more of processors 2330 to implement aspects of the image editing techniques described herein. Program instructions 2315, which may include program instructions configured to implement graphics application 2320, may be partly or fully resident within the memory 2310 of computer system 2300 at any point in time. Alternatively, program instructions 2315 may be provided to GPU 2340 for performing image editing operations (or portions thereof) on GPU 2340 using one or more of the techniques described herein. In some embodiments, the techniques described herein may be implemented by a combination of program instructions 2315 executed on one or more processors 2330 and one or more GPUs 2340, respectively. Program instructions 2315 may also be stored on an external storage device (not shown) accessible by the processor(s) 2330 and/or GPU 2340, in some embodiments. Any of a variety of such storage devices may be used to store the program instructions 2315 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 2330 and/or GPU 2340 through one or more storage or I/O interfaces including, but not limited to, interconnect 2360 or network interface 2350, as described herein. In some embodiments, the program instructions 2315 may be provided to the computer system 2300 via any suitable computer-readable storage medium including memory 2310 and/or external storage devices described above. Memory 2310 may also be configured to implement one or more data structures 2325, such as one or more data structures configured to store data representing texture elements (texels) and/or properties thereof, visual textures (texture-maps) and/or properties thereof, one or more input images, output images, or intermediate images (e.g., support drawings associated with an image). Data structures 2325 may be accessible by processor(s) 2330 and/or GPU 2340 when executing graphics application 2320 or other program instructions 2315.

As shown in FIG. 23, processor(s) 2330 may be coupled to one or more of the other illustrated components by at least one communications bus, such as interconnect 2360 (e.g., a system bus, LDT, PCI, ISA, or other communication bus type), and a network interface 2350 (e.g., an ATM interface, an Ethernet interface, a Frame Relay interface, or other interface). The CPU 2330, the network interface 2350, and the memory 2310 may be coupled to the interconnect 2360. It should also be noted that one or more components of system 2300 might be located remotely and accessed via a network.

As noted above, in some embodiments, memory 2310 may include program instructions 2315, comprising program instructions configured to implement graphics application 2320, as described herein. Graphics application 2320 may be implemented in various embodiments using any desired programming language, scripting language, or combination of programming languages and/or scripting languages, e.g., C, C++, C#, Java™, Perl, etc. For example, in one embodiment, graphics application 2320 may be JAVA based, while in another embodiments, it may be implemented using the C or C++ programming languages. In other embodiments, graphics application 2320 may be implemented using specific graphic languages specifically for developing programs executed by specialize graphics hardware, such as GPU 2340. In general, various components of graphics application 2320 may be implemented using any combination of programming languages. In addition, graphics application 2320 may be embodied on memory specifically allocated for use by graphics processor(s) 2340, such as memory on a graphics board including graphics processor(s) 2340. Thus, memory 2310 may represent dedicated graphics memory as well as general-purpose system RAM, in various embodiments. Memory 2310 may in some embodiments also include a data store configured to store image data for one or more input images and/or output images, in various embodiments. Other information not described herein may be included in memory 2310 and may be used to implement the methods described herein and/or other functionality of computer system 2300.

Network interface 2350 may be configured to enable computer system 2300 to communicate with other computers, systems or machines, such as across a network. Network interface 2350 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 2300 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 2350 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 2340 may be implemented in a number of different physical forms. For example, GPU 2340 may take the form of a dedicated graphics card, an integrated graphics solution and/or a hybrid solution. GPU 2340 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 23, memory 2310 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 2340 and the rest of the computer system 2300 may travel through a graphics card slot or other interface, such as interconnect 2360 of FIG. 23.

Computer system 2300 may also include one or more additional I/O interfaces, such as interfaces for one or more user input devices 2370, or such devices may be coupled to computer system 2300 via network interface 2350. For example, computer system 2300 may include interfaces to a keyboard, a mouse or other cursor control device, a joystick, or other user input devices 2370, in various embodiments. Additionally, the computer system 2300 may include one or more displays (not shown), coupled to processors 2330 and/or other components via interconnect 2360 or network interface 2350. Such input/output devices may be configured to allow a user to interact with graphics application 2320 to request or invoke various image editing operations and/or to specify various parameters, thresholds, and/or other configurable options available to the user when editing images while executing graphic application 2320. It will be apparent to those having ordinary skill in the art that computer system 2300 may also include numerous other elements not shown in FIG. 23.

Note that program instructions 2315 may be configured to implement a graphic application 2320 as a stand-alone application, or as a module of another graphics application or graphics library, in various embodiments. For example, in one embodiment program instructions 2315 may be configured to implement graphics applications such as painting, publishing, photography, games, animation, and/or other applications, and may be configured to edit images as part of one or more of these graphics applications. In another embodiment, program instructions 2315 may be configured to implement the image editing techniques described herein in one or more functions called by another graphics application executed on GPU 2340 and/or processor(s) 2330. Program instructions 2315 may also be configured to render images and present them on one or more displays as the output of an image editing operation and/or to store image data for modified images in memory 2310 and/or an external storage device(s), in various embodiments. For example, a graphics application 2320 included in program instructions 2315 may utilize GPU 2340 when modifying, rendering, or displaying images in some embodiments.

While various image editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:
1. A system, comprising:
one or more processors, and
a memory coupled to the one or more processors and storing program instructions executable by the one or more processors to implement:

receiving input specifying one or more texture distribution rules;

applying the one or more texture distribution rules to create a texture map of a visual texture comprising an arrangement of one or more instances of each of one or more atomic texture elements of the visual texture; and storing data representing the texture map for subsequent application of the visual texture to an image, wherein the data representing the texture map comprises data representing one or more diffusion curves.

2. The system of claim 1, wherein the program instructions are further executable by the one or more processors to implement:

accessing data representing at least a portion of a two-dimensional image to which the visual texture is to be applied;

applying the visual texture to the at least a portion of the two-dimensional image; and producing data representing an output image, wherein the visual texture is applied to the at least a portion of the two-dimensional image in the output image.

3. The system of claim 2, wherein the program instructions are further executable by the one or more processors to implement:

generating a planar map defining two or more regions of the two-dimensional image, wherein said generating is dependent on one or more diffusion curves associated with the two-dimensional image;

wherein said applying the visual texture to the at least a portion of the two-dimensional image comprises mapping or projecting the visual texture onto one of the two or more regions of the two-dimensional image.

4. The system of claim 2, wherein the data representing the one or more diffusion curves comprises data representing a diffusible attribute whose value is specified at one or more control points along the one or more diffusion curves; and wherein said applying the visual texture comprises diffusing the diffusible attribute within the at least a portion of the two-dimensional image.

5. The system of claim 4, wherein the diffusible attribute comprises a color, blur, normal, or height field attribute.

6. The system of claim 2, wherein the program instructions are further executable by the one or more processors to implement:

receiving input defining a shape of the one or more diffusion curves and one or more diffusible attributes of the one or more diffusion curves; and producing the data representing the one or more diffusion curves.

7. The system of claim 2, wherein said applying the visual texture comprises:

receiving input specifying a value of one or more texture parameters of the visual texture, wherein the one or more texture parameters comprise one or more of: a translation in a specified plane, a rotation around a specified axis, a spacing between atomic texture element instances, a size of one or more atomic texture element instances, or an orientation of one or more atomic texture element instances; and modifying the visual texture in accordance with the received value of the one or more texture parameters.

8. The system of claim 2, wherein said applying the visual texture comprises applying a shading or lighting effect to the at least a portion of the image dependent on one or more of: a diffusible attribute of the texture map, a diffusible attribute of the at least a portion of the image, a light source applied to the two-dimensional image, a shading model, a camera parameter, or a viewer parameter.

9. The system of claim 1, wherein said applying the one or more texture distribution rules comprises:

replicating the one or more atomic textural elements to create two or more instances of each of the one or more atomic textural elements;

wherein the texture distribution rules comprise one or more of: a rule defining a regular grid over which the two or more instances of each of the one or more atomic textural elements are to be distributed, or a rule defining a uniform randomized distribution of the two or more instances of each of the one or more atomic textural elements.

10. The system of claim 1, wherein the one or more atomic texture elements of the visual texture comprises two or more atomic texture elements; and wherein the program instructions are further executable by the one or more processors to implement:

receiving input specifying one or more geometric or photometric properties of one or more example atomic texture elements; and modifying a value of at least one parameter of the one or more example atomic texture elements to generate the two or more atomic texture elements of the visual texture.

11. The system of claim 10, wherein the at least one parameter comprises a color, shape, normal, orientation, rotation, or size.

12. The system of claim 10, wherein said modifying comprises interpolating between values of the at least one parameter of the two or more example atomic texture elements to determine values of the at least one parameter of the two or more atomic texture elements.

13. A method, comprising:

using a computer to perform:

receiving input specifying one or more texture distribution rules;

applying the one or more texture distribution rules to create a texture map of a visual texture comprising an arrangement of one or more instances of each of one or more atomic texture elements of the visual texture; and storing data representing the texture map for subsequent application of the visual texture to an image.

applying the visual texture to at least a portion of data representing a two-dimensional image;

wherein the data representing the texture map comprises data representing one or more diffusion curves.

14. The method of claim 13, further comprising:

using the computer to perform:

accessing the data representing the two-dimensional image;

producing data representing an output image, wherein the visual texture is applied to the at least a portion of the two-dimensional image in the output image;

wherein the data representing the two-dimensional image also comprises data representing one or more diffusion curves;

wherein the data representing the one or more diffusion curves comprises data representing a diffusible attribute whose value is specified at one or more control points along the one or more diffusion curves; and wherein said applying the visual texture comprises diffusing the diffusible attribute within the at least a portion of the two-dimensional image.

15. The method of claim 14, wherein said applying the visual texture comprises:

receiving input specifying a value of one or more texture parameters of the visual texture, wherein the one or more texture parameters comprise one or more of: a translation in a specified plane, a rotation around a specified axis, a spacing between atomic texture element instances, a size of one or more atomic texture element instances, or an orientation of one or more atomic texture element instances; and modifying the visual texture in accordance with the received value of the one or more texture parameters.

16. The method of claim 13, wherein said applying the one or more texture distribution rules comprises:

replicating the one or more atomic textural elements to create two or more instances of each of the one or more atomic textural elements;

wherein the texture distribution rules comprise one or more of: a rule defining a regular grid over which the two or more instances of each of the one or more atomic textural elements are to be distributed, or a rule defining a uniform randomized distribution of the two or more instances of each of the one or more atomic textural elements.

17. A tangible computer-readable storage medium storing program instructions executable by one or more processing devices of a computing device to implement:

receiving input specifying one or more texture distribution rules;

applying the one or more texture distribution rules to create a texture map of a visual texture comprising an arrangement of one or more instances of each of one or more atomic texture elements of the visual texture; and storing data representing the texture map for subsequent application of the visual texture to an image;

accessing data representing a two-dimensional image;

applying the visual texture to at least a portion of the two-dimensional image;

producing data representing an output image, wherein the visual texture is applied to the at least a portion of the two-dimensional image in the output image;

wherein at least the data representing the texture map comprises data representing one or more diffusion curves.

18. The storage medium of claim 17, wherein the data representing the one or more diffusion curves comprises data representing a diffusible attribute whose value is specified at one or more control points along the one or more diffusion curves; and wherein said applying the visual texture comprises diffusing the diffusible attribute within the at least a portion of the two-dimensional image.

19. The storage medium of claim 18, wherein said applying the visual texture comprises applying a shading or lighting effect to the at least a portion of the image dependent on one or more of: a diffusible attribute of the texture map, a diffusible attribute of the at least a portion of the image, a light source applied to the two-dimensional image, a shading model, a camera parameter, or a viewer parameter.

20. The storage medium of claim 17, wherein the one or more atomic texture elements of the visual texture comprises two or more atomic texture elements; and wherein the program instructions are further executable by the one or more processors to implement:

receiving input specifying one or more geometric or photometric properties of one or more example atomic texture elements; and modifying a value of at least one parameter of the one or more example atomic texture elements to generate the two or more atomic texture elements of the visual texture.

* * * * *